United States Patent [19]

Ikeda

[11] Patent Number: 5,768,229
[45] Date of Patent: Jun. 16, 1998

[54] OPTICAL STORAGE APPARATUS WITH TRACK SEEKING CONTROL SYSTEM

[75] Inventor: Toru Ikeda, Kawasaki, Japan

[73] Assignee: Fujitsu Limited, Kawasaki, Japan

[21] Appl. No.: 781,958

[22] Filed: Dec. 20, 1996

[30] Foreign Application Priority Data

May 20, 1996 [JP] Japan ................... 8/124411

[51] Int. Cl.$^6$ .................................. G11B 7/085
[52] U.S. Cl. ........................ 369/44.28; 369/44.29
[58] Field of Search ................ 369/44.28, 44.29, 369/44.35, 44.34, 32, 44.32, 44.36; 360/78.05, 78.06

[56] References Cited

U.S. PATENT DOCUMENTS

| | | | |
|---|---|---|---|
| 5,182,736 | 1/1993 | Yanagi | 369/44.28 |
| 5,195,067 | 3/1993 | Yanagi | 369/44.28 |
| 5,258,966 | 11/1993 | Yanagi | 369/44.28 |
| 5,289,447 | 2/1994 | Kobayashi et al. | 369/44.28 |
| 5,351,222 | 9/1994 | Ikeda et al. | 369/44.28 |
| 5,487,055 | 1/1996 | Suzuki | 369/44.29 |
| 5,675,562 | 10/1997 | Yanagi | 369/44.29 |

FOREIGN PATENT DOCUMENTS

| | | |
|---|---|---|
| 1184727 | 7/1989 | Japan . |
| 2201739 | 8/1990 | Japan . |
| 4038724 | 2/1992 | Japan . |
| 4245035 | 9/1992 | Japan . |
| 4265532 | 9/1992 | Japan . |
| 5128565 | 5/1993 | Japan . |

*Primary Examiner*—Thang V. Tran
*Attorney, Agent, or Firm*—Greer, Burns, Crain, Ltd.

[57] ABSTRACT

A low speed lens lock control unit detects an amount of an optical axial deviation of an objective lens from an offset of a tracking error signal which is obtained in a low speed seeking mode and drives a carriage actuator so as to set the optical axial deviation of the objective lens to zero. A high speed lens lock control unit detects an amount of an optical axial deviation of the objective lens from an offset of a tracking error signal which is obtained in a high speed seeking mode and drives a lens actuator so as to set the optical axial deviation of the objective lens to zero.

14 Claims, 20 Drawing Sheets

MEDIUM
INSERTING
DIRECTION

FIG. 5
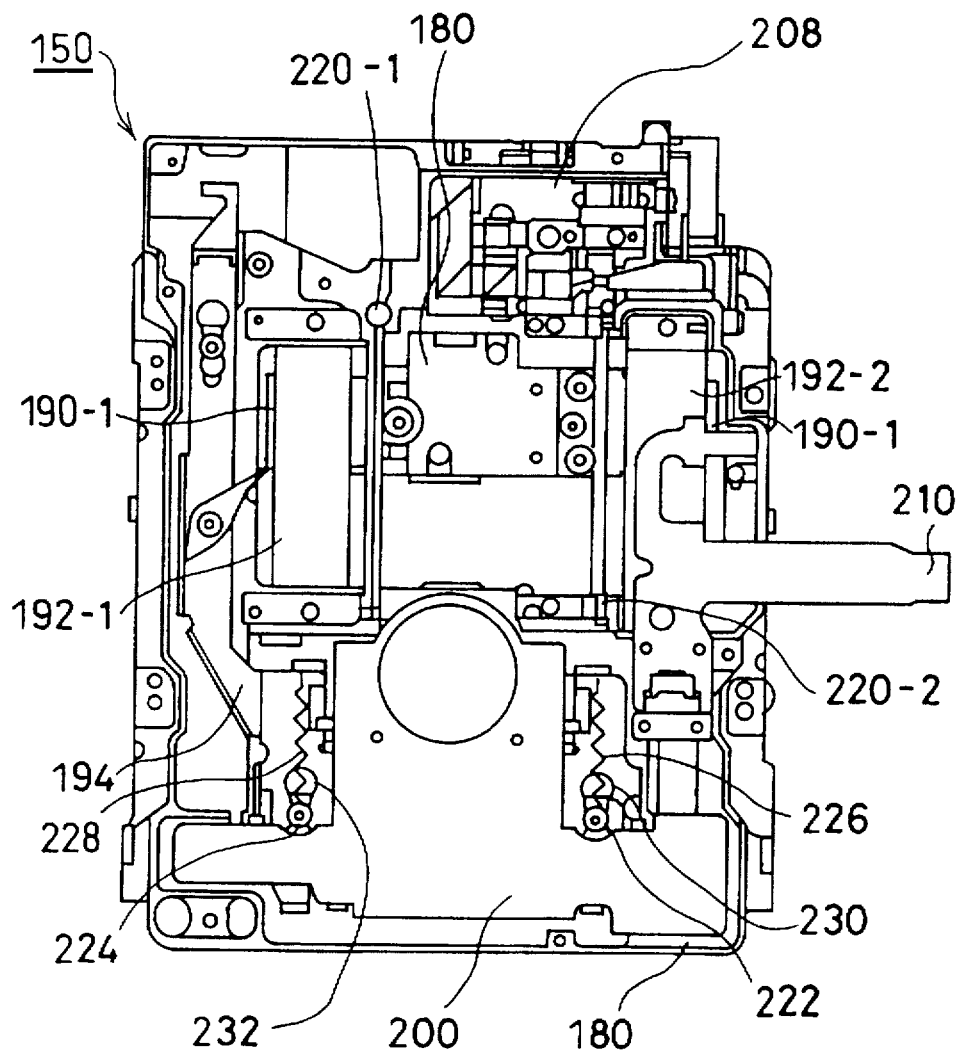
MEDIUM
INSERTING
DIRECTION

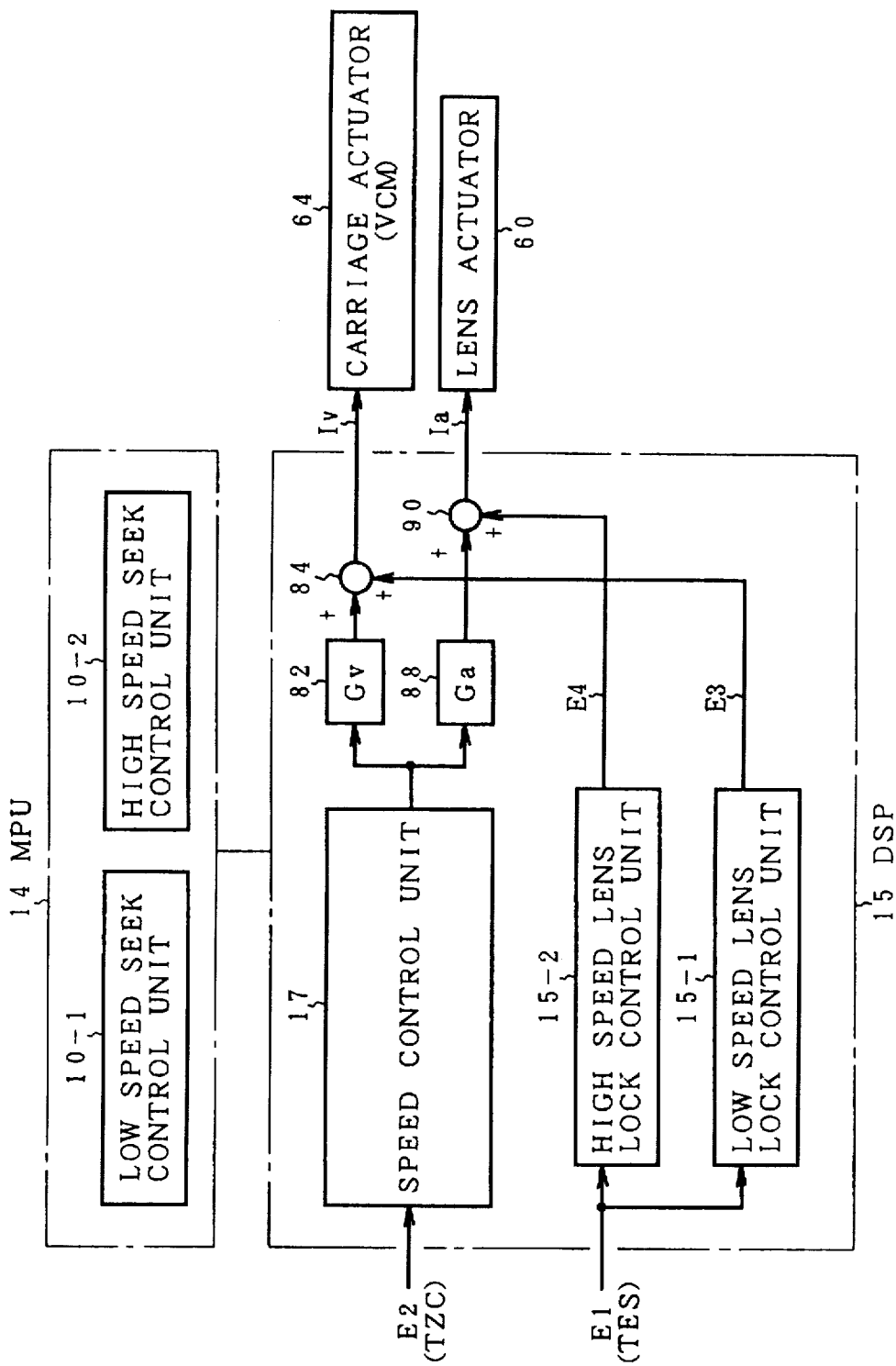

TRACKING ERROR
SIGNAL E1

PSEUDO LENS
POSITION SIGNAL E3

TRACKING ERROR
SIGNAL E1

PSEUDO LENS
POSITION SIGNAL E4

FIG. 15A
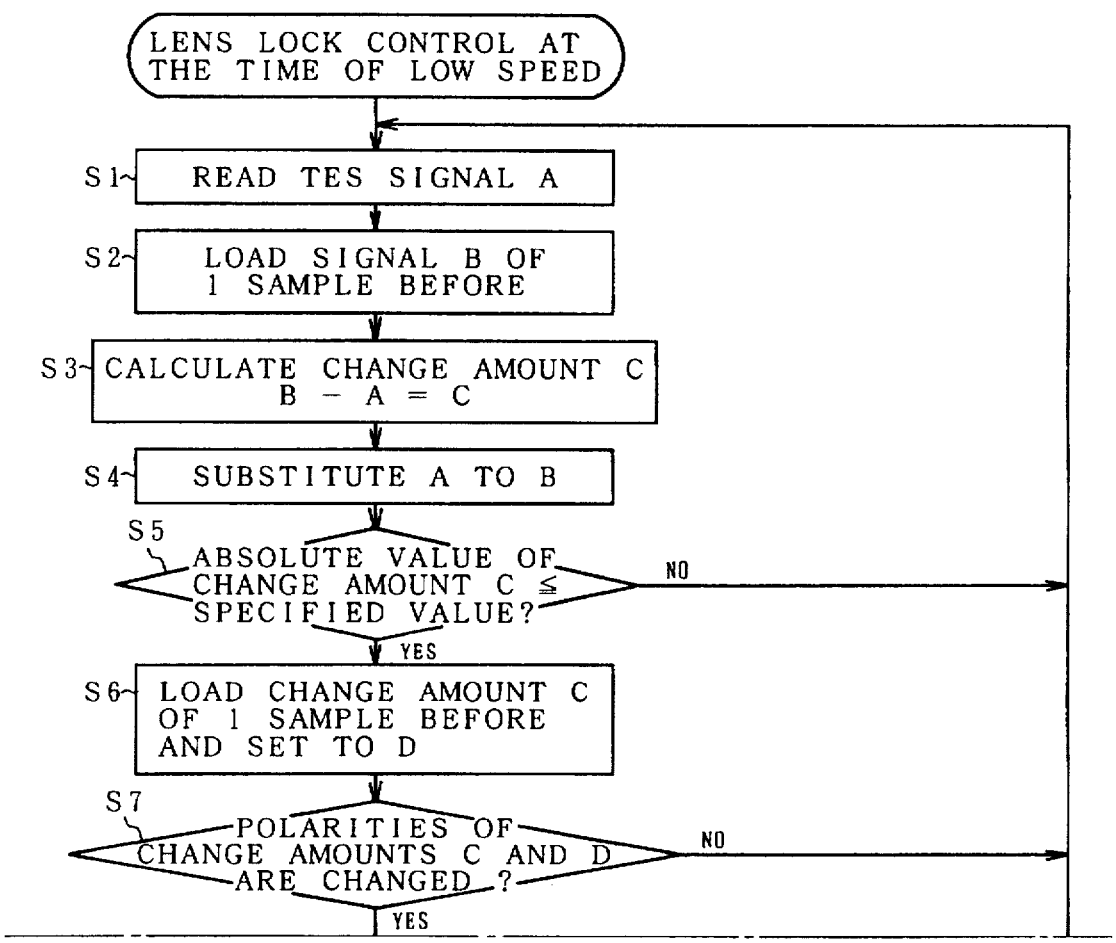

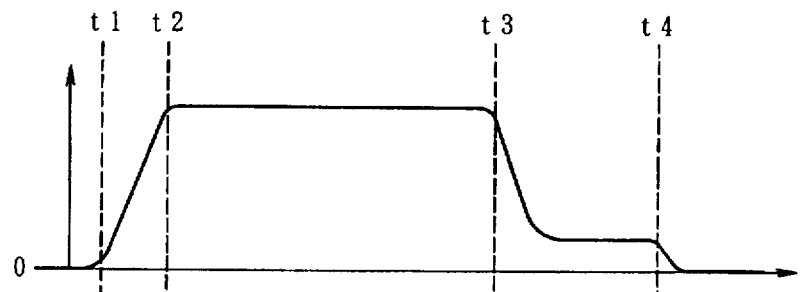
FIG. 16A BEAM SPEED
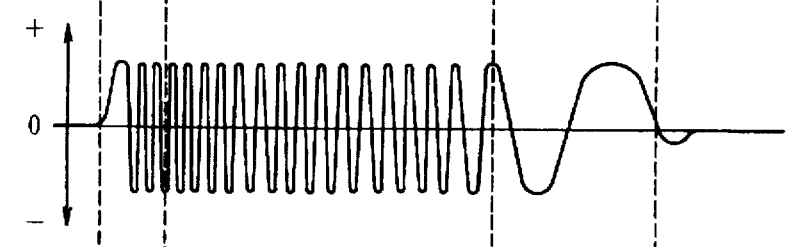
FIG. 16B TRACKING ERROR SIGNAL E1
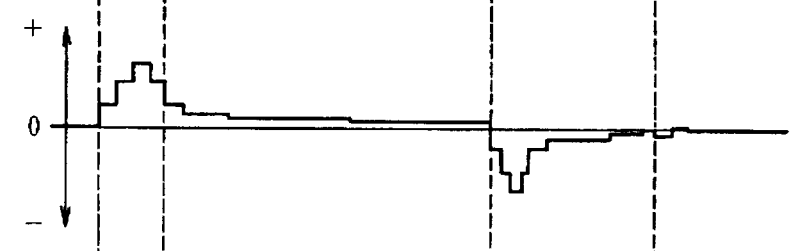
FIG. 16C LENS ACTUATOR CURRENT Ia
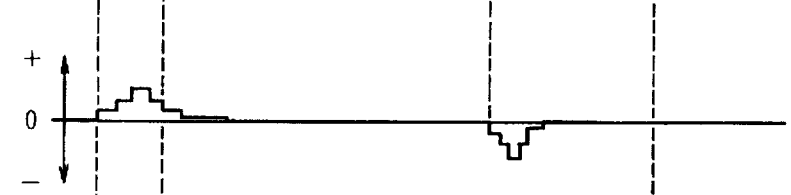
FIG. 16D VCM CURRENT Iv
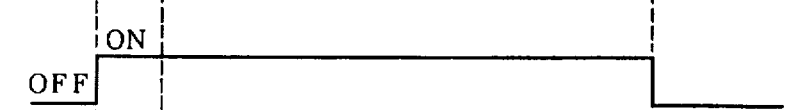
FIG. 16E SEEKING MODE
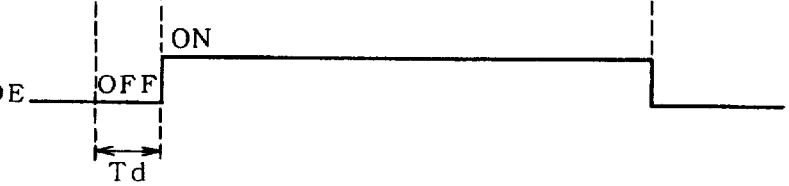
FIG. 16F LENS LOCK MODE

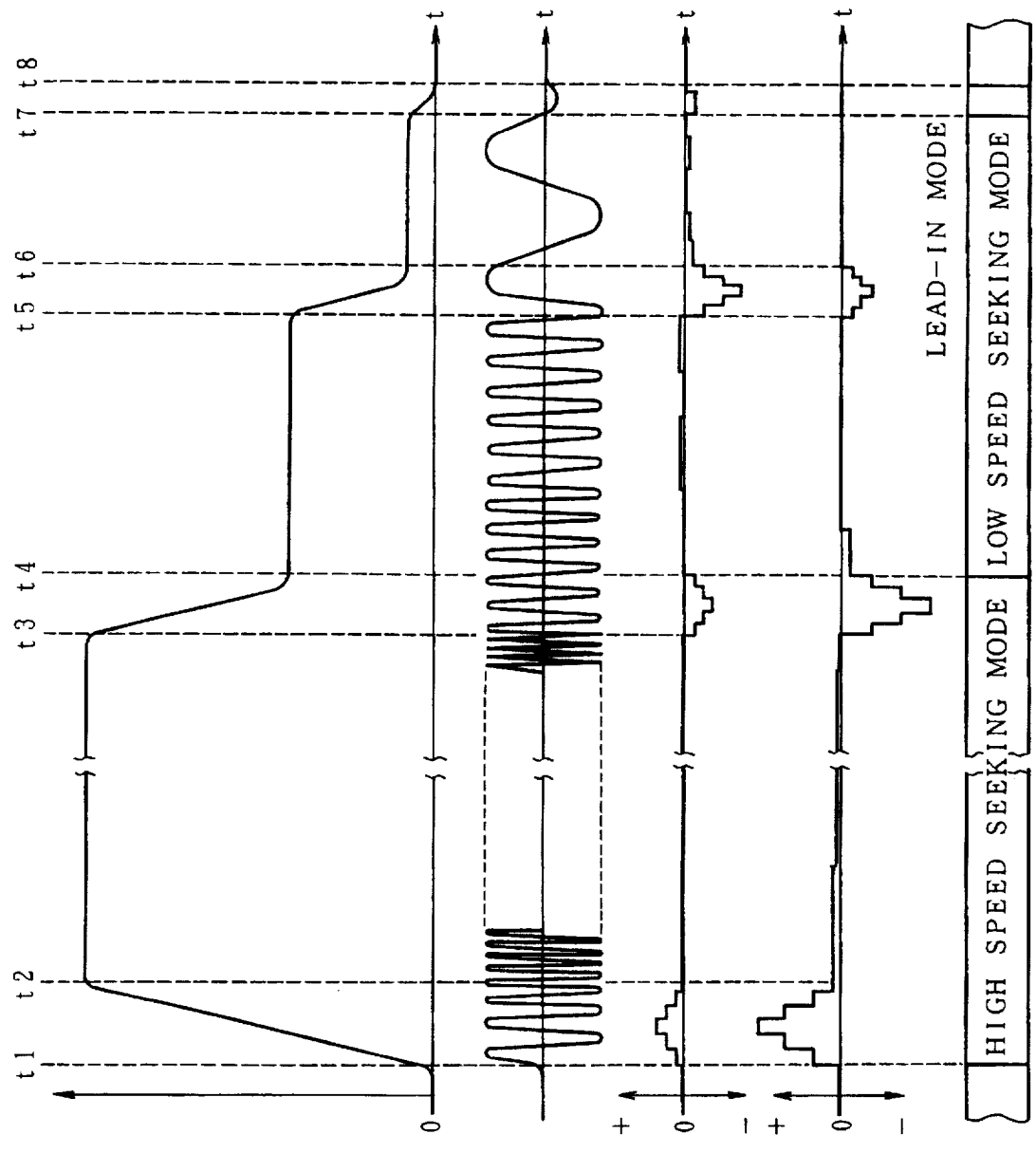

OPTICAL STORAGE APPARATUS WITH TRACK SEEKING CONTROL SYSTEM

BACKGROUND OF THE INVENTION

The invention relates to an optical storage apparatus for optically recording and reproducing information to an exchangeable medium such as an MO cartridge or the like and, more particularly, to an optical storage apparatus for electrically substituting a lens position sensor eliminated for the purpose of realization of a thin apparatus.

Attention is paid to an optical disk as a storage medium which is a nucleus of multimedia that has rapidly been developed in recent years. For example, when seeing an MO cartridge of 3.5 inches, MO cartridges of 128 MB, 230 MB, and the like are provided. An optical disk drive using such an MO cartridge is provided as an external storage apparatus of a personal computer of a desk top type. Further, the use in a personal computer of a notebook type which has rapidly been spread in recent years and has an excellent portability is also strongly demanded. Therefore, in order to equip the optical disk drive as a standard external storage apparatus, it is necessary to realize a miniaturization and a thin structure. For example, a height of HDD or FDD which has at present been installed in the personal computer of the desk top type is equal to about 17 mm and it is also necessary to set the optical disk drive to a similar thickness.

In the optical disk drive, a pickup mechanism of a linear driving type is provided in such a direction as to transverse tracks on the medium. The pickup mechanism is constructed by a fixed optical unit and a movable optical unit mounted on a carriage that is linearly driven by a VCM. A lens actuator is provided for the movable optical unit. The lens actuator has a relatively complicated mechanism which requires a two-dimensional degree of freedom such that an objective lens is moved in the direction which transverses the tracks by a current supply to a tracking coil and the objective lens is moved in the vertical direction by a current supply to a focusing coil. Further, the lens actuator can move the objective lens by only a micro distance to the inner side or the outer side by the current supply to the tracking coil around the position, as a center, where the center of the objective lens is made coincide with an optical axis of a light beam from the fixed optical unit. A lens position sensor is ordinarily installed in order to detect a deviation amount of the optical axis of the lens from the neutral position of the lens. Therefore, in order to make the optical disk drive thin, it is necessary to simplify a structure of a pickup and to reduce a space in the height direction. If the lens position sensor provided for the lens actuator can be eliminated, the optical disk drive can be further made thin. For this purpose, the inventors et al. of the present invention have proposed an optical storage apparatus (Japanese Patent Application No. 7-201229) in which by paying attention to a phenomenon such that when a lens actuator is moved to the inner side or outer side from the neutral position, an offset appears in a tracking error signal which is detected from a return light from a medium, a lens position signal can be electrically detected even if the lens position sensor is not provided.

Ordinarily, as for the lens position signal, when the objective lens is moved from the neutral position during the seek of a carriage by the driving of the VCM, a deviation of the optical axis occurs. To prevent it, simultaneously with a speed control of the VCM, it is necessary to execute a lens lock control to control the position of the lens actuator so as to keep the optical axial deviation of the objective lens to zero, specifically speaking, so as to always set the lens position signal to zero. Such a control is generally called a double servo control because the carriage and the lens actuator are simultaneously controlled. According to a method of detecting the lens position signal from a tracking error signal, by eliminating high frequency components by transmitting the tracking error signal derived during the seek through a low pass filter, a pseudo lens position signal having a level according to the optical axial deviation of the lens and a polarity according to the deviation direction is obtained. Therefore, the lens lock control to prevent the optical axial deviation during the seek can be performed even if the lens position sensor is not provided.

The seek control to move the light beam to a target track is divided into a long seek in which the number of tracks to the target track exceeds, for example, 50 tracks and a short seek in which the number of tracks is less than 50 tracks. In the long seek, the carriage is first sought at a high speed by the speed control of the VCM, and when the number of remaining tracks is equal to 50, a control mode is switched to a low speed seek by the speed control of the lens actuator, thereby moving the light beam to the target track. When the light beam reaches the target track, the control mode is switched to the position control and the light beam is pulled in the track center. After completion of a settlement, a reading or writing operation is started. The speed control of the VCM and lens actuator during the seek is a control for tracing a target speed that is set in accordance with the number of tracks to the target track and has a speed profile of an acceleration, a constant speed, and a deceleration. On the other hand, in case of the short seek in which the number of tracks to the target track is less than 50, the low speed seek by the speed control of the lens actuator is executed from the beginning. When the light beam reaches the target track, it is pulled in.

However, there are the following problems when the lens position signal is falsely obtained by transmitting the tracking error signal through a low pass filter without providing the lens position sensor. First, during the seek, the lens lock control to always keep the optical axial deviation of the objective lens to zero is needed. When the objective lens causes the optical axial deviation during the seek, an offset occurs in the tracking error signal detected from the return light from the medium. There are inconveniences such that a zero-cross point to count the number of times of the passing of the tracks cannot be accurately detected, and when the light beam is pulled in the target track, an error occurs in the beam position by the offset and it takes a time to pull in. Therefore, with respect to any one of the high speed seek by the driving of the VCM and the low speed seek by the driving of the lens actuator, the lens lock control is necessary. However, when detecting the lens position signal by allowing the tracking error signal to pass through the low pass filter, at the times of the acceleration and deceleration of the light beam, since a frequency of the tracking error signal fluctuates, there is a problem such that a stable lens position signal cannot be derived from the low pass filter. Therefore, the pseudo lens position signal that is derived from the low pass filter is valid only in a constant speed period of time during which the frequency of the tracking error signal is constant. Therefore, in the acceleration and deceleration periods of time, by smoothly accelerating and decelerating the VCM, a motion of the lens actuator is minimized or by applying the same acceleration and deceleration by supplying an acceleration current or deceleration current to the lens actuator in correspondence to the acceleration and deceleration of the VCM, the occurrence of the optical axial deviation of the lens is prevented.

However, the acceleration current and deceleration current which are used in the lens locking operations upon acceleration and deceleration relate to the control by the fixed current values determined on the basis of design values of the carriage and lens actuator. In the actual apparatus, therefore, an external force such as friction, vibration, or the like which cannot be predicted exists and the same acceleration and deceleration as those of the carriage by the VCM cannot be applied to the lens actuator and the optical axial deviation of the lens is likely to occur.

At the time of the low speed seek in which the lens actuator is driven, the lens position signal is not derived from the low pass filter which detects the lens position signal from the tracking error signal in the high speed seeking mode. At the time of the high speed seek by the driving of the carriage by the VCM, the frequency of the tracking error signal is equal to tens of kHz or higher. On the other hand, at the time of the low speed seek by the driving of the lens actuator, the frequency of the tracking error signal is so low to be 10 kHz or lower and the tracking error signal in the low speed seeking mode passes as it is through the low pass filter, so that the lens position signal cannot be detected. Therefore, in the low speed seeking mode, the currents according to the acceleration and deceleration of the lens actuator are supplied to the VCM irrespective of the lens position signal and the same acceleration and deceleration as those of the lens actuator are applied to the carriage, thereby preventing the optical axial deviation of the lens. However, the lens lock control when no lens position signal is derived is a control by the fixed current values determined on the basis of the design values of the carriage and the lens actuator. When an external force such as friction, vibration, or the like which cannot be predicted is received, the optical axial deviation of the lens is likely to occur.

With respect to the high speed seek as well, since the control mode has been switched to the low speed seek at a position before the target track, even if the acceleration and deceleration are executed by the fixed current values determined on the basis of the design values of the carriage and the lens actuator, when an external force such as friction, vibration, or the like which cannot be predicted is applied, the same acceleration and deceleration as those of the lens actuator cannot be applied to the carriage. Thus, an offset of the tracking error signal occurs due to the optical axial deviation of the lens. The number of times of the passing of the tracks is erroneously counted. It takes a time to pull in the light beam to the target track.

SUMMARY OF THE INVENTION

According to the invention, there is provided an optical storage apparatus in which even during the low speed seek when a light beam approaches a target track as well as during the high speed seek, a lens position signal is derived from a tracking error signal and a lens lock control to set an optical axial deviation to zero can be properly executed.

First, an optical storage apparatus of the invention comprises: a lens actuator for moving an objective lens to irradiate a light beam to a medium in the direction which transverses tracks on the medium; and a carriage actuator (VCM) for moving a carriage on which the lens actuator is mounted in the direction which transverses the tracks on the medium. A tracking error signal according to the position in the direction which transverses the tracks of the light beam is formed by a tracking error signal forming circuit on the basis of a photosensitive output of a return light from the medium. A seek control has a low speed seek unit and a high speed seek unit. The low speed seek unit moves the light beam to a target position at a low speed by the driving of the lens actuator. The high speed seek unit moves the light beam to the target position at a high speed by the driving of the carriage actuator.

With respect to such an optical storage apparatus, according to the invention, a low speed lens lock control unit and a high speed lens lock control unit are individually provided. The low speed lens lock control unit detects an amount of an optical axial deviation of an objective lens from an offset of the tracking error signal which is obtained in a low speed seeking mode and drives the carriage actuator so as to set the optical axial deviation of the objective lens to zero. The high speed lens lock control unit detects an amount of an optical axial deviation of the objective lens from an offset of the tracking error signal which is obtained in a high speed seeking mode and drives the lens actuator so as to set the optical axial deviation of the objective lens to zero. Therefore, a lens position signal is falsely obtained from the tracking error signal even during the low speed seek. The carriage actuator moves while tracing the motion of the lens actuator on the basis of the lens position signal so as to set the optical axial deviation of the lens to zero. Therefore, even if a friction, an external vibration, or the like which cannot be predicted by a fixed inertia compensation of the carriage actuator is applied during the low speed seek, the lens lock control to maintain the optical axial deviation of the objective lens to zero can be properly executed. Since the tracking error signal has no offset, the number of times of the passing of the tracks due to the detection of the zero-cross point can be accurately counted. The pull-in to the target track can be stabilized. The total accessing performance can be improved.

The low speed lens lock control unit comprises: a peak value detecting unit for detecting a positive peak value and a negative peak value of each cycle of the tracking error signal; and an offset calculating unit for calculating the value of ½ of a difference between the positive and negative peak values as an offset amount, thereby detecting a pseudo lens position detection signal. It is suitable for a digital process of the tracking error signal. Even at a low frequency of the tracking error signal in which it is difficult to construct a filter, the lens position signal can be accurately formed. It is also suitable in case of realizing a servo system of the seek control by a DSP or the like. As a high speed lens lock control unit, there is used a low pass filter for removing high frequency components by a cut-off frequency corresponding to the frequency of the tracking error signal in the high speed seeking mode and detecting an offset amount corresponding to a change in envelope of the tracking error signal as a lens position signal. The tracking error signal in the high speed seek has a frequency of 10 kHz or lower. Low frequency components can be relatively easily removed by the low pass filter. Any one of an analog active filter and a digital filter can be used as a low pass filter.

As another form of the low speed and high speed lens lock control units, it is also possible to provide: a low pass filter for removing high frequency components of a tracking error signal and detecting an offset amount which traces a change in envelope as a lens position signal; and a filter characteristics switching unit for switching a cut-off frequency of the low pass filter to a low band side in the low speed seeking mode and to a high band side in the high speed seeking mode. In this case, since it is sufficient to use one low pass filter and to merely switch a cut-off frequency of such a low pass filter, a circuit construction can be simplified.

In yet another form of the low speed and high speed lens lock control units, there are provided: a low pass filter for a high speed for removing high frequency components by a cut-off frequency on the high band side corresponding to a frequency of a tracking error signal in a high speed seeking mode and outputting a resultant signal as a lens position signal; and a low pass filter for a low speed, serially connected to the low pass filter for a high speed, for removing high frequency components by a cut-off frequency on the low band side corresponding to a frequency of the tracking error signal in a low speed seeking mode and outputting a resultant signal as a lens position signal.

When the number of tracks to a target track is less than a predetermined value, the light beam is moved at a low speed by the low speed seek control unit. When the number of tracks to the target track exceeds the predetermined value, the light beam is moved at a high speed by the high speed seek control unit. When the number of tracks to the target track reaches another predetermined value during the high speed movement, a control mode is switched to a low speed movement of the light beam by the low speed seek control unit. The low speed seek control unit controls a speed of the lens actuator so as to trace a target speed which was set in accordance with the number of tracks to the target track and applies an acceleration or deceleration for an inertia compensation corresponding to the acceleration or deceleration of the lens actuator to the carriage actuator with respect to each of an acceleration period of time and a deceleration period of time of the speed control. For example, the low speed seek control unit supplies an inertia compensation current Iv in which an inertia compensation coefficient a1 is multiplied to an acceleration or deceleration current Ia of the lens actuator to the carriage actuator. Now, assuming that an acceleration gain of the lens actuator is set to Ka, an acceleration gain of the tracking actuator is set to Kv, a mass of the lens actuator is set to Ma, and a mass of the carriage actuator is set to Mv, the inertia compensation coefficient a1 is defined as $$\alpha 1 = (KV/Ka) \cdot \{Ma/(Ma+Mv)\}$$

The high speed seek control unit controls the speed of the carriage actuator so as to trace the target speed which was set in accordance with the number of tracks to the target track and applies an acceleration or deceleration for an inertia compensation corresponding to the acceleration or deceleration of the carriage actuator to the lens actuator with respect to each of the acceleration period of time and deceleration period of time of the speed control. For example, the high speed seek control unit supplies an inertia compensation current Ia in which an inertia compensation coefficient $\alpha^2$ is multiplied to the acceleration or deceleration current Iv of the carriage actuator to the lens actuator.

The above and other objects, features, and advantages of the present invention will become more apparent from the following detailed description with reference to the drawings.

BRIEF DESCRIPTION OF THE DRAWINGS

FIG. 5 is a bottom view of the assembling state of FIG. 2;

FIG. 8 is a functional block diagram of a seek control unit of the invention;

FIGS. 15A and 15B are detailed flowcharts for an inertia compensation control and a lens lock control of the VCM in the low speed seeking mode in FIG. 14;

FIGS. 16A to 16F are time charts for a beam speed, a tracking error signal, a lens actuator current, a VCM current, a seeking mode, and a lens locking mode at the time of a low speed seek control;

FIGS. 17A to 17E are time charts for a beam speed, a tracking error signal, a lens actuator current, a VCM current, and a control mode at the time of a high speed seek control;

DETAILED DESCRIPTION OF THE PREFERRED EMBODIMENTS

[Structure of apparatus]

Figure 1:
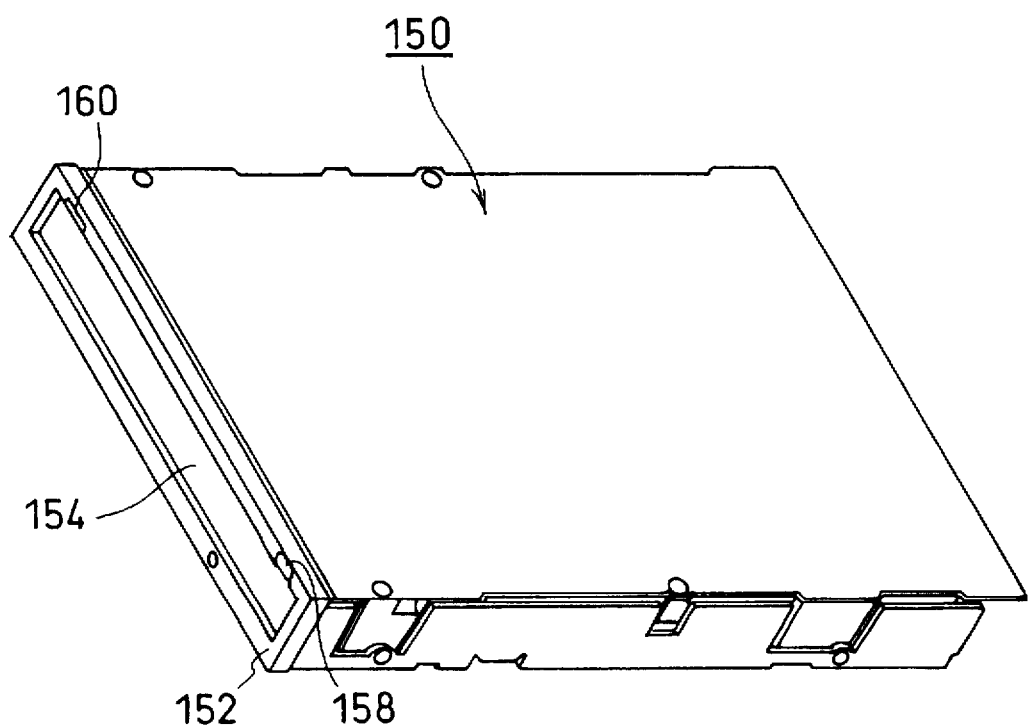
FIG. 1 is an explanatory diagram of an external view of an apparatus according to the invention.

FIG. 1 is an explanatory diagram of an external view of an optical storage apparatus, namely, an optical disk drive of the invention. A front vessel 152 whose medium inserting slot is opened is provided in a front portion of a drive main body 50. A door 154 is attached to the medium inserting slot of the front vessel 152 so as to be rotatable around upper portions on both sides of the door as axes and is urged in a closing direction by a built-in spring. Therefore, the door is opened and closed in association with an insertion and an ejection of an MO cartridge medium. An ejection button 158 and an operation display LED 160 are provided around the front vessel 152. A height of front vessel 152 is equal to about 17 mm and a height of drive main body 150 is slightly lower than the front vessel.

Figure 2:
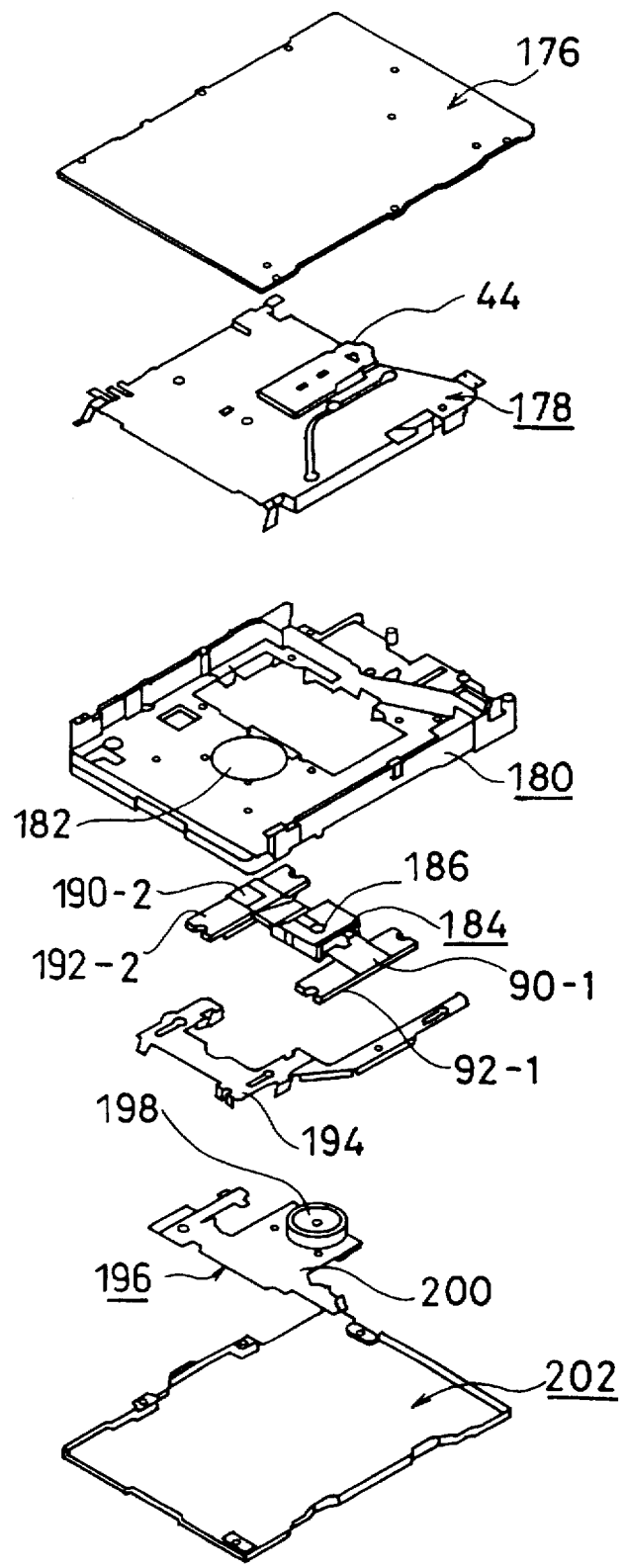
FIG. 2 is an assembly exploded diagram of the apparatus of FIG. 1.
Figure 3:
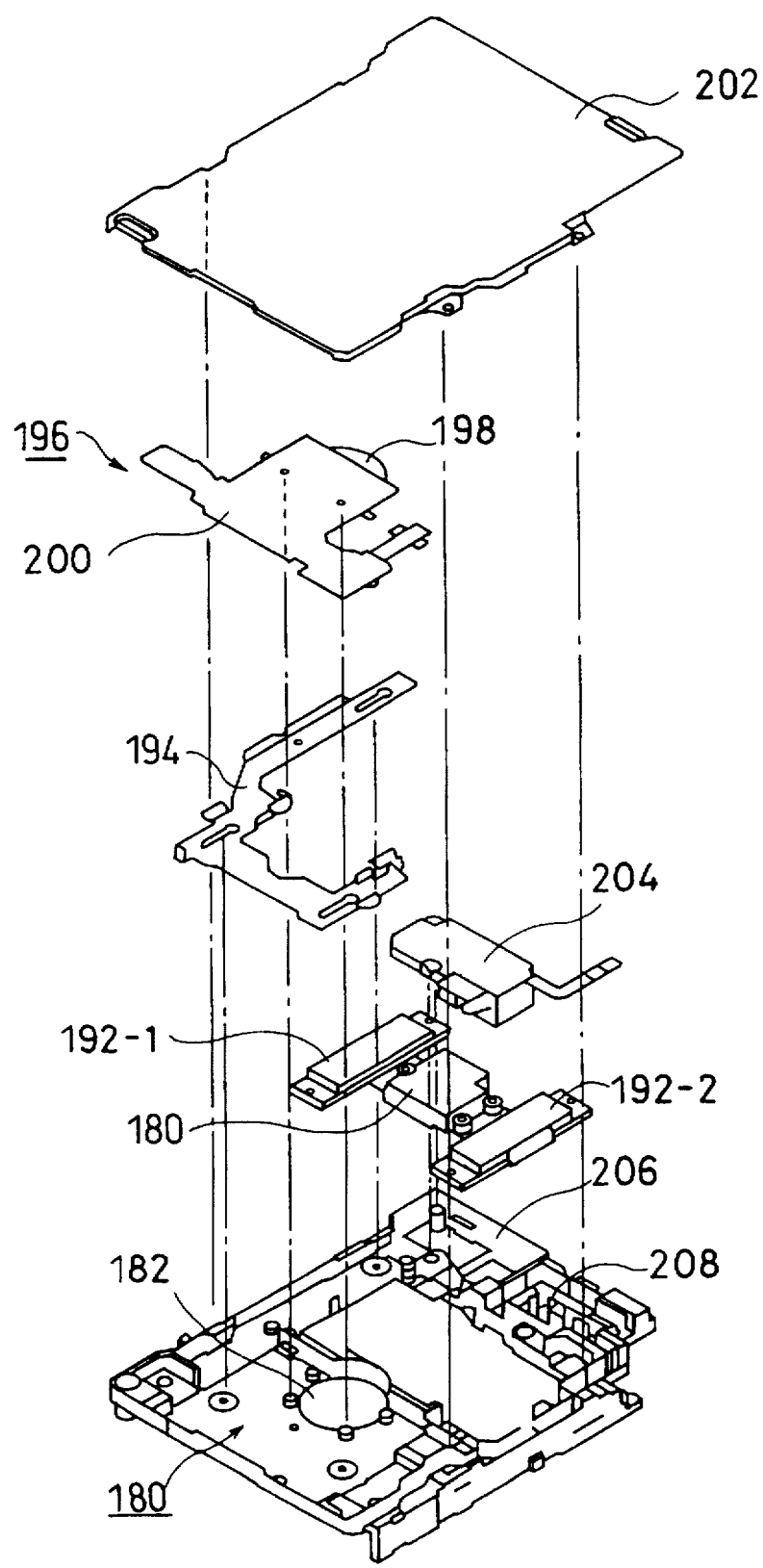
FIG. 3 is an assembly exploded diagram when component elements from a drive casing to a lower cover in FIG. 2 are seen from a bottom surface.

FIG. 2 is an assembly exploded diagram of the drive main body 150 in FIG. 1. The drive main body 150 is constructed by a printed circuit board 176, a cartridge holder 178, a drive base 180, a lens carriage 184, a slide plate 194, a spindle unit 196, and a cover 202 from the upper side. Among them, with respect to the component elements from the drive base 180 to the lower cover 202, further, an assembly exploded diagram in a state in which they are seen from the back side is shown in FIG. 3. A control circuit necessary for a control of the drive main body 150 is installed on the printed circuit board 176. The cartridge holder 178 forms a medium enclosing space between the cartridge holder and the drive base 180 locating in the lower position and positions the MO cartridge medium inserted from the front side. An electromagnet 44 is attached. The lens carriage 184, slide plate 194, and spindle unit 196 are attached to the drive base 180. The lens carriage 184 constructs a movable optical system. An objective lens 186 is installed on the lens carriage 184. A laser beam from the fixed optical unit 208 provided on the bottom portion side of the drive base 180 in FIG. 3 enters the objective lens 186. A beam spot is irradiated to the medium locating at the upper position. A return light is returned to the fixed optical unit 208. Coil portions 190-1 and 190-2 of the VCM are arranged on both sides of the lens carriage 184. The coil portions 190-1 and 190-2 are arranged through gaps to magnetic yoke portions 192-1 and 192-2 which are fixedly arranged. Therefore, by supplying currents to the coil portions 190-1 and 190-2, a linear motor is formed between the magnetic yoke portions 192-1 and 192-2. The lens carriage 184 can be made operative in the direction which transverses the tracks on the medium. A lens actuator to move the objective lens 186 in the direction which transverses the tracks on the medium and a focusing actuator to move the objective lens 186 in the optical axial direction and execute a focusing control are installed on the lens carriage 184. In association with the insertion of the MO cartridge medium, the slide plate 194 attaches a medium hub to a turntable 198 locating under the spindle unit 196. When the MO cartridge medium is ejected, the slide plate 194 is integratedly moved in the depth direction for the drive base 180 in FIG. 2 by the driving of an ejection motor unit 204 in FIG. 3, the turntable 198 is lifted down and is unlocked from the medium, and the MO cartridge medium is ejected by a spring provided for the cartridge holder 178. In the spindle unit 196, the turntable 198 is attached onto a plate 200 and a spindle motor is assembled in the turntable 198. In the spindle unit 196, by assembling the plate 200 to the lower side of the drive base 180, the turntable 198 is located at an opening 182.

Figure 4:
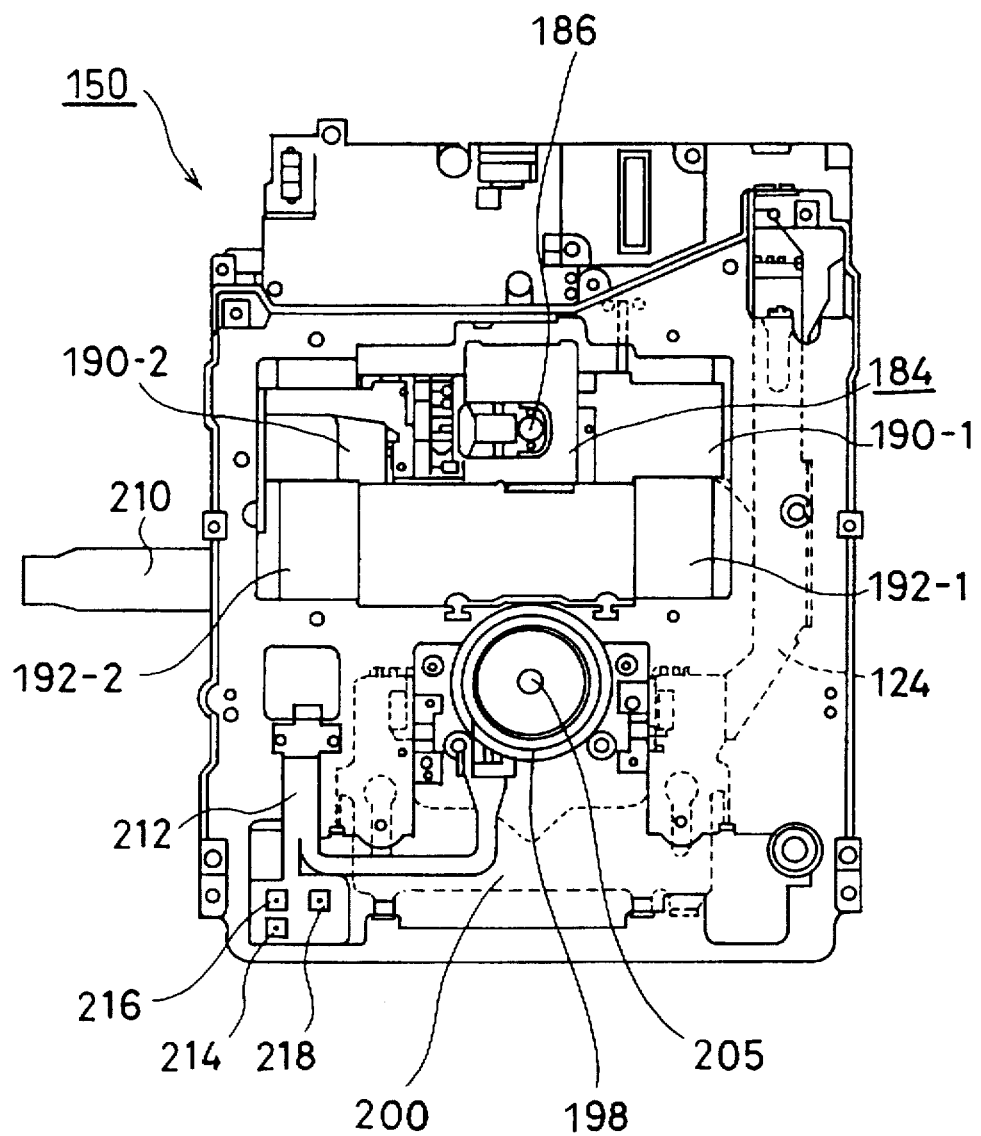
FIG. 4 is a plan view of an assembling state of FIG. 2.

FIG. 4 is a plan view of a state in which the printed circuit board 176 and cartridge holder 178 in FIG. 2 are removed from the drive main body in FIG. 1. A spindle shaft 205 is provided at the center of the turntable 198 in the spindle unit. The hub of the medium of the MO cartridge inserted from the medium inserting slot serving as a lower side is coupled to the spindle shaft 205. In association with the insertion of the medium, when the medium hub is located at the spindle shaft 205, it is attracted by a magnet chucking, thereby coupling the hub to the spindle shaft 205. The objective lens 186 is provided for the lens carriage 184 so as to face upward. The lens carriage 184 is moved in the vertical direction for the magnetic yoke portions 192-1 and 192-2 by a current supply to the coil portions 190-1 and 190-2 arranged on both sides, namely, in the direction which transverses the tracks on the medium attached to the spindle shaft 205. An FPC (flexible printed circuit) 212 is arranged on the medium inserting side serving as a front side of the turntable 198, thereby electrically connecting with a spindle motor built in the turntable 198. The FPC 212 continues to an FPC 210 taken out to the side surface side, thereby connecting with the printed circuit board side. A write enable sensor 214, a write protection sensor 216, and a cartridge insertion sensor 218 are provided for the FPC 212 arranged on the entrance side. Pin switches or the like are used for those three sensors 214, 216, and 218. The write enable sensor 214 detects a write enable position of an switching knob between a write enable and a write protection provided for the MO cartridge medium. The write protection sensor 216 detects a write protecting position of a switching knob between the write enable and the write protection of the medium. The cartridge insertion sensor 218 detects the insertion of the MO cartridge medium for the driver 54, thereby allowing the drive to be activated. Specifically speaking, the turntable 198 is rotated by the spindle motor, thereby starting the operation of the controller.

Figure 6:
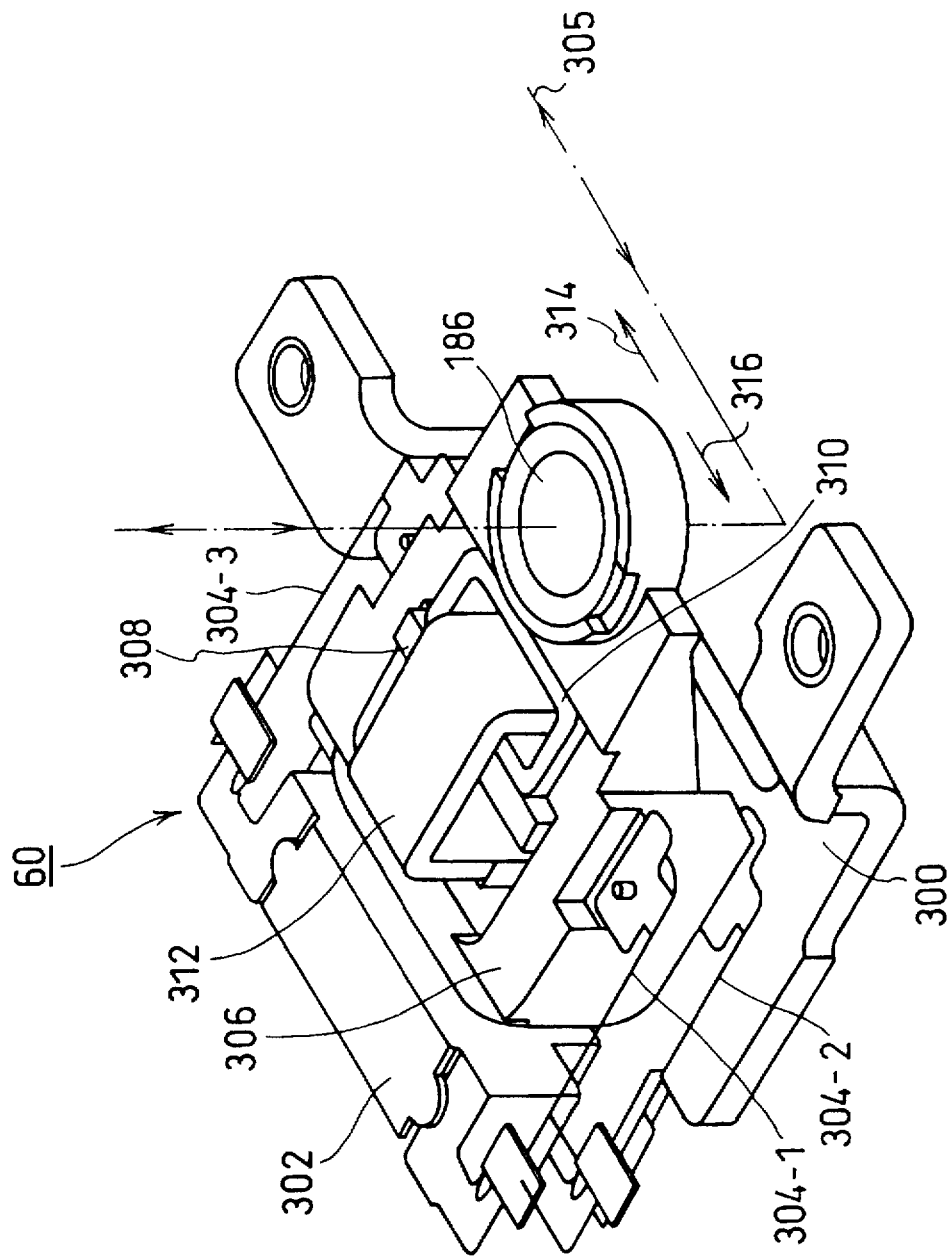
FIG. 6 is an explanatory diagram of a structure of a lens actuator which is used in the invention.

FIG. 5 shows a back side of the drive main body 150 in FIG. 1 in a state in which the cover 202 in FIG. 3 is removed. In FIG. 6, the slide plate 194 is attached to pins 222 and 224 fixed on the drive base 180 side so as to be slidable in the medium inserting direction by guide grooves 230 and 232. Further, the slide plate 194 is urged to the medium inserting side by coil springs 226 and 228. Therefore, when the MO cartridge is inserted from the medium inserting slot side serving as a lower side in the diagram, the slide plate 194 is integratedly moved and is locked at positions where the lower sides of the guide grooves 230 and 232 are come into contact with the pins 222 and 224. In this state, the medium hub is attached to the turntable. The fixed optical unit 208 is provided to the upper side in the diagram which faces the lens carriage 184. A detector for recording and reproduction by a laser diode, a detector for a tracking control and a focusing control, and further, their optical system are assembled into the fixed optical unit 208.

FIG. 6 shows a lens actuator 60 mounted on the lens carriage 184 in FIG. 2. According to the lens actuator 60, four wires 304-1 to 304-4 (304-4 is not shown) are supported in a cantilever state to the side surface of a holding unit 302 attached to a fixed base 300 and a movable base 306 is supported at four points to edges of the wires 304-1 to 304-4. Therefore, the movable base 306 has a three-dimensional degree of freedom for the holding unit 302 serving as a fixed side by a bending work of the four wires 304-1 to 304-4. The objective lens 186 is mounted on the movable base 306. A light beam having a beam optical axis 305 from the fixed optical unit which was reflected by the lower portion is converged by the objective lens 186, thereby forming an image onto the medium surface locating above the objective lens. The objective lens 186 also returns the return light from the medium to the fixed optical unit by the same optical path. A tracking coil 308 and a focusing coil 310 are mounted onto the movable base 306. The tracking coil 308 is located so as to wind around the horizontal portion on the lower side of a yoke 312 provided for the fixed base 300. By supplying a current to the coil, the tracking coil 308 moves the objective lens 186 through the movable base 306 in the outer direction shown by an arrow 314 or the inner direction shown by an arrow 316. The focusing coil 310 is located so as to wind around the vertical portion of the yoke 312. By supplying a current to the coil, the focusing coil 310 vertically moves the objective lens 186 through the movable base 306. A lens position sensor to detect a positional deviation of a lens optical axis of the objective lens 186 for the beam optical axis 305 from the fixed optical system is not provided for the lens actuator 60 in order to make the apparatus thin. A lens positional deviation of the objective lens 186 is falsely formed on the basis of a tracking error signal which is derived from the photosensitive output of the return light from the medium. A lens position signal (LPOS) falsely formed from the tracking error signal is used for a lens lock control to drive the lens actuator 60 so as to keep the lens positional deviation for the beam optical axis to zero in the high speed seeking mode in which the carriage movement by the VCM is mainly performed. The lens position signal is also used for a lens lock control to drive the carriage by the VCM so as to keep the positional deviation of the optical axis of the objective lens to zero in the low speed seeking mode in which the lens actuator 60 is mainly used.

[Circuit construction]

Figure 7A:
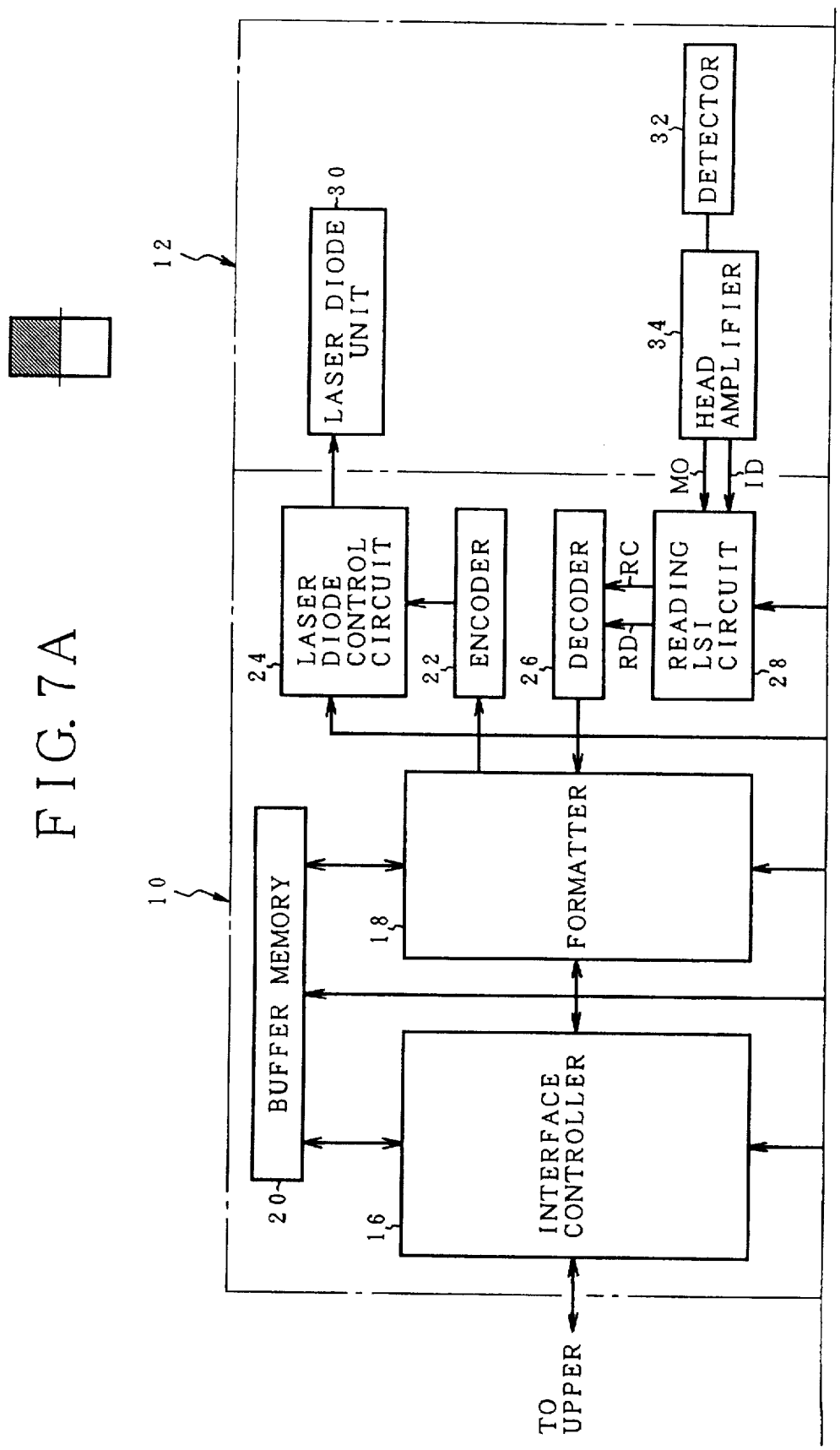
FIGS. 7A and 7B are circuit block diagrams of the invention.
Figure 7B:
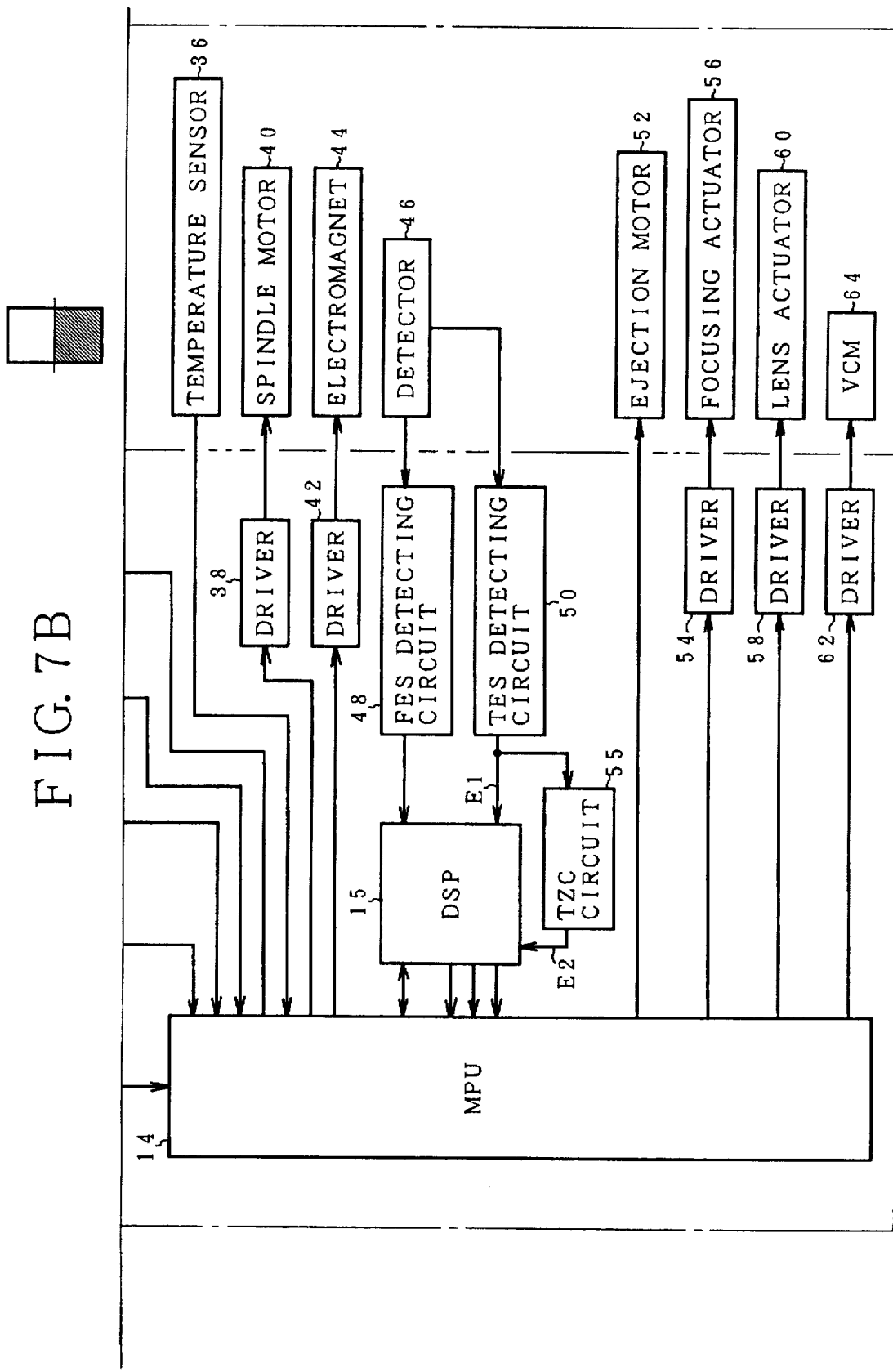

FIGS. 7A and 7B are circuit block diagrams on the side of a controller and an enclosure which are provided for the drive main body 150 in FIG. 1. The optical disk drive of the invention is constructed by a controller 10 and an enclosure 12. The controller 10 has: an MPU 14 to control the whole optical disk drive; an interface controller 16 for transmitting and receiving commands and data to/from an upper apparatus; a formatter 18 for executing processes necessary to write and read data to/from the medium; and a buffer memory 20. In the embodiment, the buffer memory 20 is commonly used by the MPU 14, interface controller 16, and formatter 18. An encoder 22 and a laser diode control circuit 24 are provided as a writing system for the formatter 18. A control output of the laser diode control circuit 24 is supplied to a laser diode unit 30 provided for the optical unit on the enclosure 12 side. The laser diode unit 30 integratedly has a laser diode and a photosensitive device for monitoring. In the embodiment, as an MO cartridge medium for performing the recording and reproduction by using the laser diode unit 30, either one of the medium of 128 MB and the medium of 230 MB can be used. A pit position recording (PPM recording) is used as a recording method in this case. A recording format of the medium is based on the ZCAV (zone constant acceleration system). The medium of 128 MB has one zone. The medium of 230 MB has ten zones. A decoder 26 and a reading LSI circuit 28 are provided as a reading system for the formatter 18. The photosensitive signal of the return light of the beam from the laser diode unit 30 by a detector 32 provided for the enclosure 12 is supplied to the reading LSI circuit 28 as an ID signal and an MO signal through a head amplifier 34. Circuit functions of an AGC circuit, a filter, a sector mark detecting circuit, a synthesizer, a PLL, and the like are provided for the reading LSI circuit 28. A read clock and read data are formed on the basis of the ID signal and MO signal inputted and are outputted to the decoder 26. Since the zone CAV is used as a recording method of the medium by a spindle motor 40, as for the reading LSI circuit 28, a switching control of a clock frequency corresponding to the zone is executed for a built-in synthesizer by the MPU 14. A detection signal of a temperature sensor 36 provided on the enclosure 12 side is supplied to the MPU 14. On the basis of a temperature in the apparatus detected by the temperature sensor 36, the MPU 14 controls a light emitting power for each of the reading, writing, and erasing operations in the laser diode control circuit 24 to an optimum value. The MPU 14 controls the spindle motor 40 provided for the enclosure 12 by a driver 38. Since the zone CAV is used as a recording format of the MO cartridge medium, the spindle motor 40 is rotated at a constant speed of, for example, 2700 rpm. The MPU 14 also controls the electromagnet 44 provided on the enclosure 12 side through a driver 42. The electromagnet 44 is arranged on the side opposite to the beam irradiating side of the MO cartridge medium loaded and applies an external magnetic field to the medium upon recording and erasing. A DSP 15 constructs a servo system of a tracking control and a focusing control of the objective lens mounted on the lens carriage. For this purpose, a 2-split detector 46 for receiving the beam return light from the medium is provided for the optical unit on the enclosure 12 side. An FES detecting circuit (focusing error signal detecting circuit) 48 forms a focusing error signal from the photosensitive output of the 2-split detector 46 and supplies to the DSP 15. A TES detecting circuit (tracking error signal detecting circuit) 50 forms a tracking error signal E1 from the photosensitive output of the 2-split detector 46 and supplies to the DSP 15. Further, the tracking error signal E1 is supplied to a zero-cross point detecting circuit (TZC circuit) 55. A track zero-cross pulse signal E2 obtained by detecting a zero-cross point of the tracking error signal E1 is supplied to the DSP 15. The DSP 15 executes various arithmetic operations for a focusing servo and a tracking servo and supplies results of the arithmetic operations to the MPU 14. On the basis of the arithmetic operation results of the DSP 15, the MPU 14 drives a focusing actuator 56 through the driver 54, drives the lens actuator 60 through a driver 58, and further drives a VCM 64 of the lens carriage through a driver 62. Further, the MPU 14 can also drive an ejection motor 52 in accordance with an ejection switch.

In the optical disk drive in FIGS. 7A and 7B, the lens position sensor to detect the position of the lens actuator on the lens carriage, a position sensing device (PSD) to detect a moving position of the lens carriage, and the like are not used on the enclosure 12 side. As a tracking servo which is realized by the DSP 15, there are a speed servo system for a seek control and a position servo system for an on-track control. The speed servo system for the seek control is divided into a long seek when the number of movement tracks to the target track is large and a short seek when the number of movement tracks to the target track is small. The short seek relates to the low speed seek control in which the driving of the lens actuator 60 is mainly performed. In this instance, a lens lock control to drive the VCM 64 is executed for a lens lock to keep an optical axial deviation of the objective lens to zero. In the long seek, first, the high speed seek control in which the driving of the VCM 64 is mainly executed is performed and, when the number of remaining tracks to the target track reaches a predetermined value, the control mode is switched to the low speed seek control in which the driving of the lens actuator 60 is mainly performed. In the high speed seek control in which the driving of the VCM 64 is mainly performed, a lens lock control to drive the lens actuator 60 is executed for a lens lock to keep the optical axial deviation of the objective lens to zero. Each of the low speed seek control in the short seek in which the driving of the lens actuator 60 is mainly performed and the high speed seek control in the long seek in which the driving of the VCM 64 is mainly performed is a speed control to control so that an actual measured speed traces a target speed according to the number of remaining tracks to the target track. The speed control has a speed profile of an acceleration period, a constant speed period, and a deceleration period. Among them, with respect to waveforms of an acceleration current upon acceleration and a deceleration current upon deceleration, since the lens lock control cannot be applied due to a cause such that the pseudo lens position signal cannot correctly be obtained at this stage, the acceleration current and the deceleration current are smoothly changed, thereby suppressing a large fluctuation of the lens position by sudden acceleration and deceleration. At the same time, a current for an inertia compensation according to the acceleration on the driving side serving as a main driving is supplied to an auxiliary driving side, thereby suppressing the fluctuation of the lens position due to the acceleration or deceleration. Thus, even at the time of the acceleration or deceleration when the pseudo lens position signal cannot be derived, the lens lock state can be guaranteed. Namely, in the optical disk drive having no lens position sensor, for example, in the high speed seeking mode in which the VCM 64 is mainly performed, an acceleration similar to that of the carriage is applied to the lens actuator 60, thereby preventing the occurrence of a relative deviation of the lens actuator 60 in association with the movement of the carriage. The carriage is slowly moved so as not to cause a shake in the lens actuator 60 when the carriage is activated by the VCM 64. By this method, the lens lock state to always keep the optical axial deviation of the objective lens of the lens actuator to zero in the high speed seek control by the driving of the VCM 64 can be maintained. Specifically speaking, the DSP 15 controls the VCM 64 by an acceleration activation control system such as to minimize a structural vibration in a manner such that a steep acceleration and deceleration pulse is not applied to the VCM 64 as possible when the lens carriage is moved by the VCM 64. A target activation of the acceleration activation control in this case is set on the assumption of an ideal model and each polynomial of the acceleration, speed, and movement distance showing a target driving profile is formed. For example, it is sufficient that a target acceleration and a target speed are calculated on the basis of the position of the carriage and the movement distance in the seeking operation of the carriage at the time of the seeking operation of the carriage and a seek current for acceleration which gently changes is supplied to the VCM 64 on the basis of the calculation results. A target activation of the control to reduce the acceleration is also similarly determined. Further, as for the low speed seek control in which the lens actuator 60 is mainly used as well, the acceleration activation control and the control to reduce the acceleration according to the profile of the target activation determined on the assumption of a similar ideal model are executed. A circuit function to form the pseudo lens position signal which is used for the lens lock control during the seek on the basis of the tracking error signal E1 is provided for the DSP 15. The detection of the pseudo lens position signal is fundamentally obtained by detecting an offset of the tracking error signal when the optical axis of the objective lens is deviated from the beam optical axis. However, a frequency which is determined by a track passing speed of the beam of the tracking error signal E1 in the high speed seeking mode and that in the low speed seeking mode are largely different. According to a single detecting function, the pseudo lens position signal can be detected only in one of those cases. According to the invention, therefore, the switching of a detecting algorithm or the switching of the detecting functions of the low speed seek and the high speed seek is realized so that both of the high speed seek and the low speed seek can be satisfied.

[Seek control]

FIG. 8 is a functional block diagram of the seek control according to the invention which is realized by the controller 10 provided for the optical disk drive in FIGS. 7A and 7B. The seek control of the invention is realized by using the servo systems for the lens actuator 60 and carriage actuator 64 provided for the DSP 15 under the controls of a low speed seek control unit 10-1 and a high speed seek control unit 10-2 provided for the MPU 14. When the number of tracks to the target track which is designated by a seek command from an upper apparatus is less than a predetermined value, for example, 50 tracks, the low speed seek control unit 10-1 of the MPU 14 is activated and executes the low speed seek control. On the other hand, when the number of tracks to the target track designated by the seek command is equal to or larger than, for example, 50 tracks, the high speed seek control unit 10-2 is activated and executes the high speed seek control. The number of tracks to the target track which is used when switching between the low speed seek control unit 10-1 and high speed seek control unit 10-2 is arbitrarily determined. Specifically speaking, it is sufficient to decide the number of tracks corresponding to the maximum movement amount of the beam on the medium surface when the optical axis of the objective lens 186 is moved by the lens actuator 60 in FIG. 6 to the inner side or outer side from the neutral position which coincides with the beam optical axis 305 of the fixed optical system. The beam movement amount on the medium surface by the movement of the objective lens 186 is equal to, for example, about 100 μm. Now, assuming that a track pitch is equal to about 2 μm, for example, it is sufficient to set the specified value to 50 tracks and to switch the low speed seek and the high speed seek. As mentioned above, the number of tracks which is used to switch between the low speed seek and the high speed seek is properly determined by a movement amount of the beam by the lens actuator and a density of the tracks on the medium. A speed control unit 17 is provided for the DSP 15. A control signal from the speed control unit 17 is given to each of gain setting devices 82 and 88. A gain Gv for the carriage actuator 64 and a gain Ga for the lens actuator 60 are set and, after that, they are supplied to the VCM 64 as a carriage actuator and the lens actuator 60 through addition points 84 and 90, respectively. In the low speed seeking mode by the low speed seek control unit 10-1, the speed control unit 17 realizes the low speed seek control in which the lens actuator 60 is mainly used. Specifically speaking, a current Ia according to a speed deviation obtained as a deviation between the target speed and an actual measured speed by the speed control unit 17 is supplied as it is to the lens actuator 60. On the other hand, for the VCM 64, by adjusting a gain of the gain setting device 82, the current Ia for an inertia compensation is supplied to the VCM 64 at the times of the acceleration and deceleration. The motion of the carriage is allowed to trace the motion of the lens actuator 60 by the VCM 64, thereby preventing the occurrence of an optical axial deviation of the objective lens. As an acceleration current and a deceleration current which are supplied to the lens actuator 60 upon acceleration and deceleration, conventional acceleration and deceleration currents of rectangular waves are not used but by supplying an acceleration current or deceleration current whose current value is increased or decreased step by step, thereby allowing a smooth acceleration to be performed. On the other hand, in the high speed seek by the high speed seek control unit 10-2, the speed control unit 17 supplies a current Iv obtained in accordance with the speed deviation between the target speed and the actual measured speed of the light beam to the VCM 64 as it is, thereby allowing the high speed seek of the carriage to be executed. At this time, by adjusting the gain Ga of the gain setting device 88, the current Ia for an inertia compensation to make the lens actuator 60 trace the acceleration or deceleration of the carriage by the VCM 64 is supplied to the lens actuator 60. With respect to the current at the time of each of the acceleration and the deceleration of the VCM 64, smooth acceleration and deceleration are obviously executed by providing a current profile whose current value is increased and decreased step by step. Further, in the high speed seek control unit 10-2, when the number of tracks to the target track reaches, for example, 50 tracks during the high speed seek, the control is shifted to the low speed seek control unit 10-1 and the control mode is switched from the high speed seek to the low speed seek. As a low speed seek in this case as well, the same seek control as the ordinary low speed seek in the case where the number of tracks to the target track is less than 50 tracks by the seek command is executed.

A low speed lens lock control unit 15-1 and a high speed lens lock control unit 15-2 are provided for the DSP 15 in correspondence to the low speed seek control unit 10-1 and high speed seek control unit 10-2 of the MPU 14. In the low speed seek control, the low speed lens lock control unit 15-1 is activated, falsely forms a lens position signal E3 from the tracking error signal E1 which is derived during the low speed seek, adds the lens position signal E3 to the addition point 84 for the VCM 64, and executes the lens lock control during the low speed seek. In the high speed seek control, the high speed lens lock control unit 15-2 is activated, likewise forms a pseudo lens position signal E4 on the basis of the tracking error signal E1 which is obtained during the high speed seek, adds the lens position signal E4 to the addition point 90 on the lens actuator 60 side, and executes the lens lock control. In the low speed lens lock control unit 15-1 and high speed lens lock control unit 15-2, the correct lens position signals E3 and E4 are not obtained upon acceleration and deceleration in each seek control. Therefore, the lens lock control is executed by using the correct lens position signals E3 and E4 which are obtained from the tracking error signal E1 for the constant speed control period after completion of the acceleration in the low speed seek control and high speed seek control.

Figure 9:
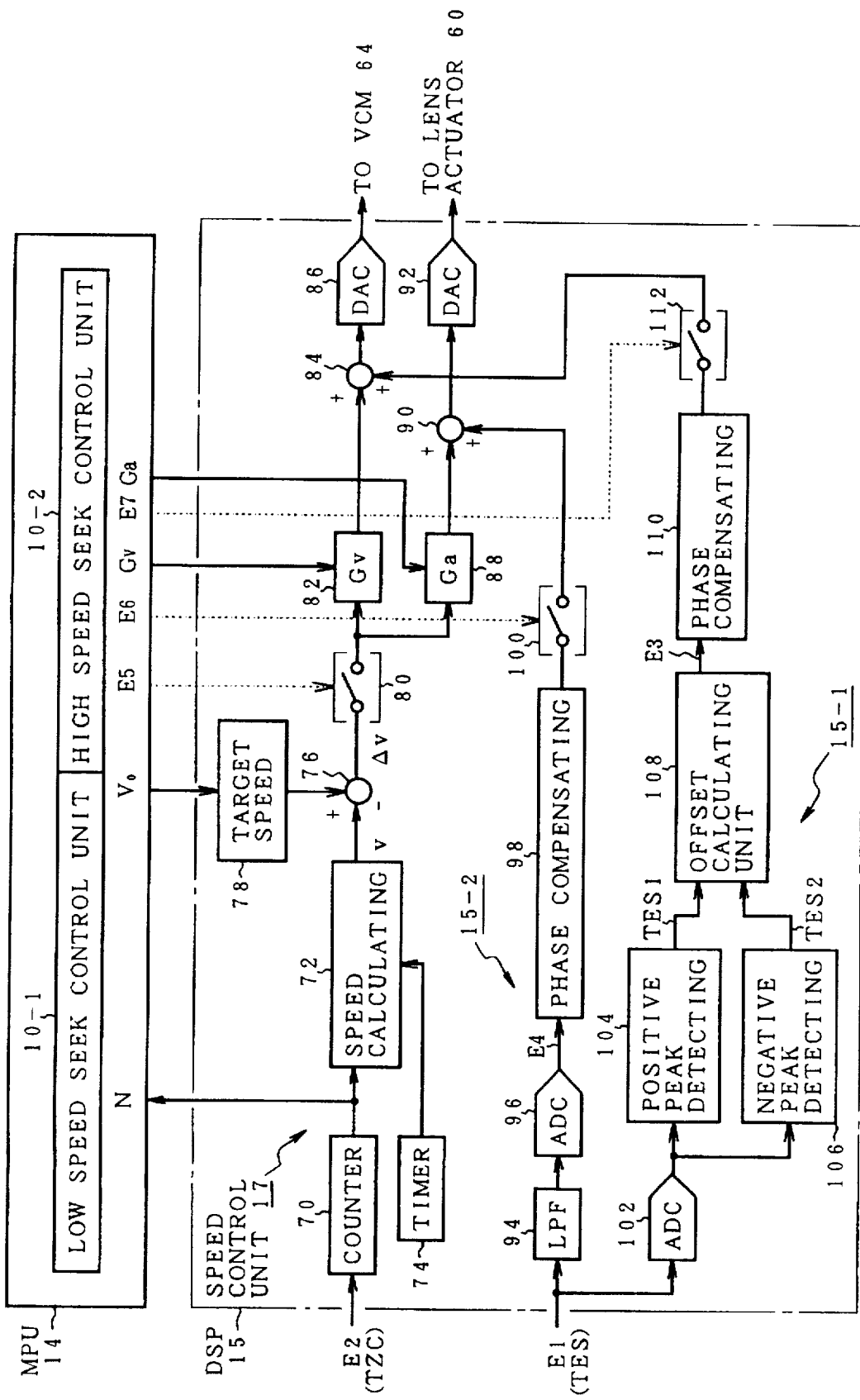
FIG. 9 is a block diagram of the first embodiment of the seek control unit in FIG. 8.

FIG. 9 is a block diagram of the first embodiment on the DSP 15 side in FIG. 8. First, the speed control unit 17 of the DSP 15 is constructed by a counter 70, a timer 74, a speed calculating unit 72, a target speed register 78, an addition point 76, and a servo switch 80. The counter 70 counts the number of track zero-cross pulses E2 which are obtained from the track zero-cross point detecting circuit (TZC circuit) 55 provided for the controller 10 in FIG. 8, thereby obtaining the number of the track on which the light beam is at present located in a real-time manner. A count value of the counter 70 indicative of the present track position is given as a track number N to the MPU 14. When receiving the seek command from the upper apparatus, therefore, the MPU 14 can recognize the number of tracks to the target track and the seeking direction (inner side or outer side) from a difference between the number N0 of the target track and the number N of the present track obtained by the counter 70. The speed calculating unit 72 counts a counting period of the track zero-cross pulses by the counter 70 on the basis of a timer clock from the timer 74 and calculates a speed V of the beam as a reciprocal number of the count value. A target speed V0 read out from a target speed table is set into the target speed register 78 in accordance with the number of tracks to the target track by the low speed seek control unit 10-1 or high speed seek control unit 10-2 which has been activated at that time in the MPU 14. The addition point 76 subtracts a measured speed V of the light beam calculated by the speed calculating unit 72 from the target speed V0 set in the target speed register 78 and generates a speed deviation Δv. The servo switch 80 provided subsequent to the addition point 76 is held in the ON state during the seek control by a control signal E5 of the MPU 14. The gains Gv and Ga are set from the MPU 14 side to the gain setting devices 82 and 88 provided in parallel subsequent to the servo switch 80. In the gain setting, at the time of the low speed seek control, the gain Ga to supply the current Ia according to the speed deviation Δv to the lens actuator 60 is set into the gain setting device 88. At the same time, the gain Gv to supply the current Iv for an inertia compensation of the VCM 64 is set into the gain setting device 82. On the contrary, at the time of the high speed seek control, the gain Gv to supply the current Iv corresponding to the speed deviation Δv to the VCM 64 is set into the gain setting device 82. At the same time, the gain Ga to supply the current Ia for an inertia compensation to the lens actuator 60 is set into the gain setting device 88.

The low speed lens lock control unit 15-1 is constructed by an A/D converter 102, a positive peak detecting unit 104, a negative peak detecting unit 106, an offset calculating unit 108, a phase compensating unit 110, and a servo switch 112. The high speed lens lock control unit 15-2 is constructed by an A/D converter 96, a low pass filter 94, a phase compensating unit 98, and a servo switch 100. At the time of the low speed seek control, the servo switch 100 is turned off by a control switch E6 from the MPU 14 and the servo switch 112 is turned on by a control signal E7 from the MPU 14. The control of the low speed lens lock control unit 15-1 is validated. On the other hand, at the time of the high speed seek control, the servo switch 100 is turned on and the servo switch 112 is turned off. The control of the high speed lens lock control unit 15-2 is validated. A detection of the pseudo lens position signal based on the tracking error signal E1 in the low speed lens lock control unit 15-1 and high speed lens lock control unit 15-2 will now be described.

Figure 10A:
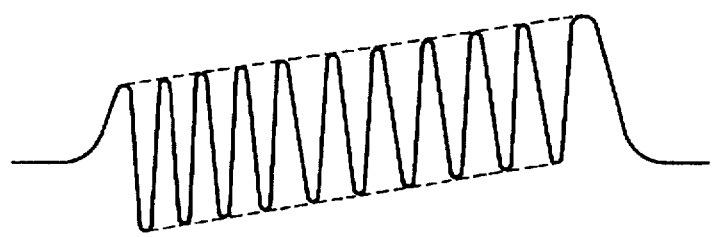
FIGS. 10A and 10B are signal waveform diagrams of a tracking error signal and a pseudo lens position signal when an objective lens is deviated from an optical axis of a beam at a low speed.
Figure 10B:

Figs. 10A and 10B are signal waveform diagrams of the pseudo lens position signal E3 which is detected as a tracking error signal E1 when the lens actuator 60 is slowly driven at a constant speed in the stop state of the carriage. As for the tracking error signal E1 in Fig. 10A, when the objective lens 186 is moved to the outer side shown at, for example, an arrow 314 at a constant speed by supplying a current to the tracking coil 308 of the lens actuator 60 in FIG. 6, the lens optical axis is deviated from the beam optical axis 305. By the movement of the objective lens 186, the light beam transverses the tracks of the medium locating on the upper side at a slow constant speed. In this instance, when the objective lens 186 is moved while making the optical axis of the objective lens 186 coincide with the beam optical axis 305, the tracking error signal E1 causes an amplitude change that is symmetrical with respect to the upper and lower positions around the zero level as a center. However, since the optical axis of the objective lens 186 is deviated from the beam optical axis 305 by the driving of only the lens actuator 60, as shown in FIG. 10A, an offset according to the deviation amount of the optical axis is caused. As for an offset according to the deviation amount of the lens optical axis of the tracking error signal E1, it is sufficient to detect it as a change amount of a straight line connecting the peak on the plus (+) side of the tracking error signal E1 or a straight line connecting the peak on the minus (-) side. Thus, the offset amount according to the optical axial deviation of the lens of the tracking error signal E1 can be detected as a pseudo lens position signal E3 as shown in FIG. 10B. In this case, with respect to the time of the first acceleration when the lens actuator is activated and the time of the last deceleration, since a frequency of the tracking error signal E1 largely changes, the pseudo lens position signal E3 becomes noises with respect to such a portion and cannot be used. Therefore, it is desirable not to use the pseudo lens position signal E3 at the time of the acceleration just after the activation and the time of the deceleration just before the end of the activation.

In the first embodiment of FIG. 9, as for the process for detecting the pseudo lens position signal E3 from the tracking error signal E1 in FIG. 10A corresponding to the case of the low speed seek, the positive peak value and the negative peak value are detected every cycle of the tracking error signal. An offset value is detected as a value of the half of a difference between both of the positive and negative peak values and is used as a lens position signal E3.

Figure 11A:
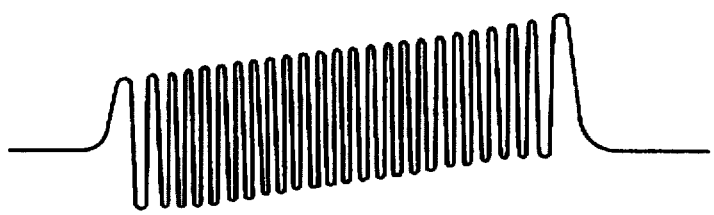
FIGS. 11A and 11B are signal waveform diagrams of a tracking error signal and a pseudo lens position signal when the objective lens is deviated from the optical axis of the beam at a high speed.
Figure 11B:

Figs. 11A and 11B are signal waveform diagrams of the tracking error signal E1 and pseudo lens position signal E4 when the lens actuator 60 is moved at the same high speed as that in the high speed seek by the VCM 64 in the stop state of the carriage. The frequency of the tracking error signal E1 which is derived by the movement of the lens actuator 60 corresponding to the high speed seeking mode is set to a high frequency such as tens of kHz. On the other hand, the frequency of the tracking error signal E1 corresponding to the low speed seeking mode of FIG. 10A is set to a low frequency of, for example, 10 kHz or less, for example, 8 kHz. Therefore, with respect to both of the low speed seeking mode and the high speed seeking mode, it is difficult to detect the lens position signal by the same process. In the first embodiment of FIG. 9, therefore, with regard to the high speed seeking mode, by transmitting the tracking error signal E1 in FIG. 11A through the low pass filter 94 in FIG. 9 and by merely removing the high frequency components, the pseudo lens position signal E4 having the offset according to the optical axial deviation of the objective lens of the tracking error signal E1 as shown in Fig. 11B is detected and is fetched as digital data via the A/D converter 96. A cut-off frequency of the low pass filter 94 which is used for the high speed seek is set to, for example, 8 kHz. Therefore, even when the low pass filter 94 is used to detect the lens position signal in the low speed seeking mode, the tracking error signal E1 in the low speed seeking mode having a band of the cut-off frequency in FIG. 10A or less passes as it is through the low pass filter 94. The pseudo lens position signal E3 as shown in FIG. 10B is not derived. In the first embodiment of FIG. 9, therefore, by providing a detecting function of the lens position signal corresponding to the frequency in each of the high speed seeking mode and the low speed seeking mode, even in any one of the low speed seeking mode and the high speed seeking mode, the stable lens position signal E3 or E4 can be obtained with regard to the constant speed period of time excluding the acceleration and deceleration periods of time before and after it.

Referring again to FIG. 9, the pseudo lens position signal E3 obtained by the offset calculating unit 108 in the low speed seeking mode is subjected to an advance phase compensation for increasing a high band gain by the phase compensating unit 110. After that, the phase compensated signal E3 is added to an inertia compensation current for the VCM 64 by the adder 84 through the servo switch 112 in the ON state in the low speed seeking mode. The carriage is moved by the VCM 64 so as to trace the motion of the lens actuator 60 during the low speed seeking operation from the adder 90, thereby applying a lens lock to maintain the deviation of the lens optical axis for the beam optical axis to zero. Similarly, with respect to the high speed lens lock control unit 15-2 side as well, the pseudo lens position signal E4 obtained by the low pass filter 94 is fetched as digital data via the A/D converter 96. After that, it is phase compensated by the phase compensating unit 98 and is supplied to the adder 90 through the servo switch 100 in the ON state in the high speed seeking mode. The adder 90 adds the phase compensated signal to the inertia compensation current generated from the gain setting device 88 in the high speed seeking mode and drives the lens actuator 60, thereby performing a lens lock to set the deviation of the lens optical axis for the beam optical axis to zero.

Figure 12:
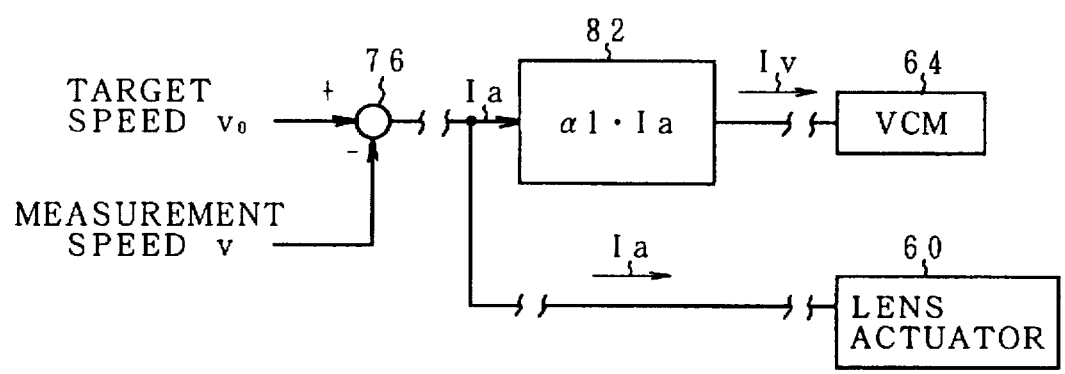
FIG. 12 is an explanatory diagram of an inertia compensation of a carriage by a VCM in a low speed seeking mode by the driving of the lens actuator.

FIG. 12 is an explanatory diagram for a gain setting operation for the gain setting device 82 to supply the inertia compensation current to the VCM 64 at the time of the low speed seek control. During the low speed seek, the current Ia is supplied from the addition point 76 to the actuator 60 by the gain Ga that is set by the gain setting device 88 (not shown) in accordance with the speed deviation Δv between the target speed V0 and the measurement speed V. In this instance, an inertia compensation coefficient α1 is set into the gain setting device 82 of the VCM 64 to execute the lens lock control. The inertia compensation coefficient α1 is defined by the following equation.

$$\alpha 1 = (Kv/Ka) \cdot \{Ma/(Ma+Mv)\} \ldots \quad (1)$$

where,

Kv: proportional gain of the VCM 64

Ka: proportional gain on the actuator 60 side

Mv: mass of carriage which is driven by the VCM 64

Ma: mass of lens actuator 60

Therefore, the inertia compensation current Iv which is supplied to the VCM 64 in this instance is defined by the following equation.

$$Iv = \alpha 1 \cdot Ia \quad (2)$$

Figure 13:
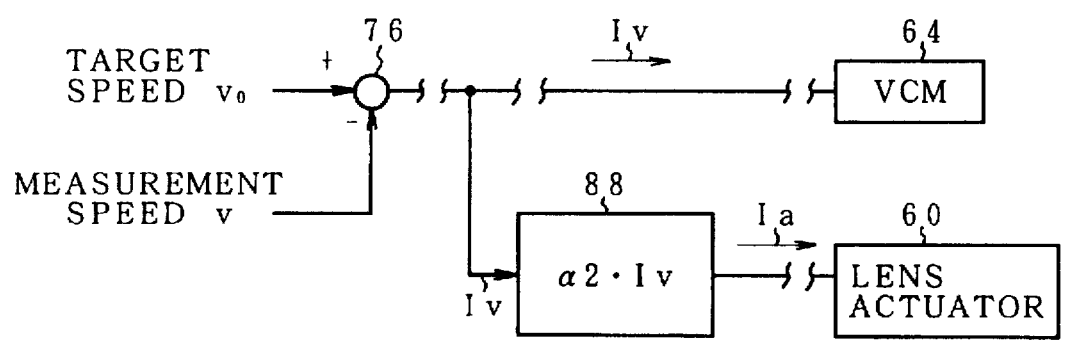
FIG. 13 is an explanatory diagram of an inertia compensation of the lens actuator in a high speed seeking mode by the driving of a carriage by the VCM.

FIG. 13 is an explanatory diagram of the gain setting device 88 on the lens actuator side to supply the inertia compensation current for the lens lock control in the high speed seeking mode. At the time of the high speed seek control, the speed deviation Δv between the target speed v0 and measurement speed V is obtained by the addition point 76. The current Iv corresponding to the speed deviation is obtained by the gain set in the current setting device 82 (not shown), thereby executing the high speed seek control by the driving of the VCM 64. In this instance, with respect to the gain setting device 88 on the lens actuator 60 side which is driven for the lens lock control, an inertia compensation coefficient α2 is set. The inertia compensation coefficient α2 is defined by the following equation.

$$\alpha 2 = (Ka/Kv) \cdot \{Mv/(Ma+Mv)\} \quad (3)$$

Therefore, when the current Iv which is supplied to the VCM 64 is determined by the speed deviation Δv, the inertia compensation current Ia which is supplied to the lens actuator 60 is unconditionally decided by the following equation.

$$Ia = \alpha 2 \cdot Iv \quad (4)$$

The inertia compensation currents for the lens lock control in the low speed seeking mode and the high speed seeking mode in FIGS. 12 and 13 as mentioned above are fixedly determined on the assumption of the ideal carriage actuator and lens actuator at the stage of the design. Actually, there is a possibility such that an optical axial deviation of the lens occurs due to factors such as friction, vibration, and the like which cannot be predicted. However, even during the low speed seek as well as the high speed seek, if the pseudo lens position signal can be correctly obtained, the optical axial deviation of the objective lens by the driving of the VCM 64 based on the lens position signal can be certainly prevented. Thus, by preventing the offset of the tracking error signal during the seek, the track zero-cross point can be accurately detected and a precision of the track counting operation can be improved. Since the offset due to the optical axial deviation is not included in the tracking error signal at a point just before the target track, the beam pull-in control for the target track, specifically speaking, the pull-in by the switching to the position servo in which the tracking error signal is set to zero can be stably executed at a high speed.

A flowchart of FIG. 10 relates to the seek control in the first embodiment of FIG. 9. First in step S1, when a seek command is received from the upper apparatus, the number N of seek tracks to the target track is calculated from the difference between the target track number and the present track number. In step S2, the number N of seek tracks is compared with a predetermined specified value N1. When it exceeds the specified value, the control mode is shifted to the high speed seek control by the speed control of the VCM in step S3. In the high speed seek control, the VCM 64 is speed controlled on the basis of a speed deviation between the target speed and the measured speed in step S3. At the same time, in step S4, the inertia compensation control for the lens actuator 60 and the lens lock control by the low speed lens lock control unit 15-1 is executed. In step S5, a check is made to see if the number N of seek tracks during the high speed seek has reached a predetermined value N2. When N reaches the predetermined number N2 of tracks, the control mode is switched to the low speed seek control by the speed control of the lens actuator 60 in step S6. During the low speed seek control, in step S7, the inertia compensation control of the VCM 64 and the lens lock control by the second lens lock control unit 15-2 are simultaneously executed. When the number N of seek tracks is equal to 0 and the light beam reaches the target track in step S8 during the low speed seek control, step S9 follows. The control mode is switched to one servo based on the tracking error signal and a beam pull-in control to the target track is executed. After completion of the beam pull-in control, in step S10, a check is made to see if a settlement such that the tracking error signal lies within a specified range around zero as a center has been finished. After completion of the settlement, a series of seek control is completed. As for processes after completion of the seek control, when the seeking operation is finished, the apparatus enters a read/write ready-on state and the data is written or read out to/from the target track. When the number N of seek tracks to the target track is less than the specified value N1 in step S1, step S6 follows and the low speed seek control is executed. The low speed seek control is also the same as the low speed seek control that is executed when N reaches the specified value N2 during the high speed seek control.

Figure 14:
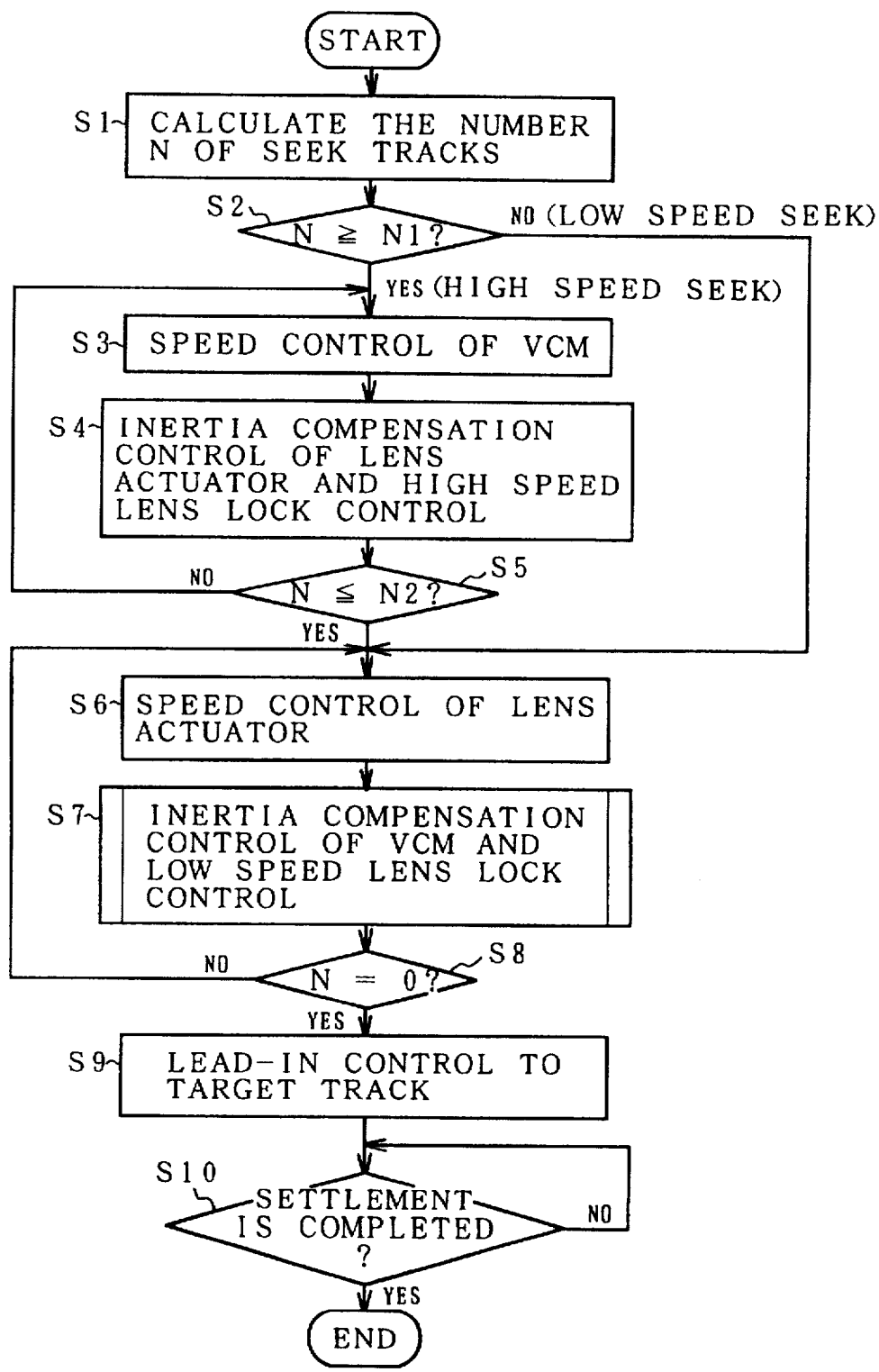
FIG. 14 is a flowchart for a seek control in FIG. 9.
Figure 15B:
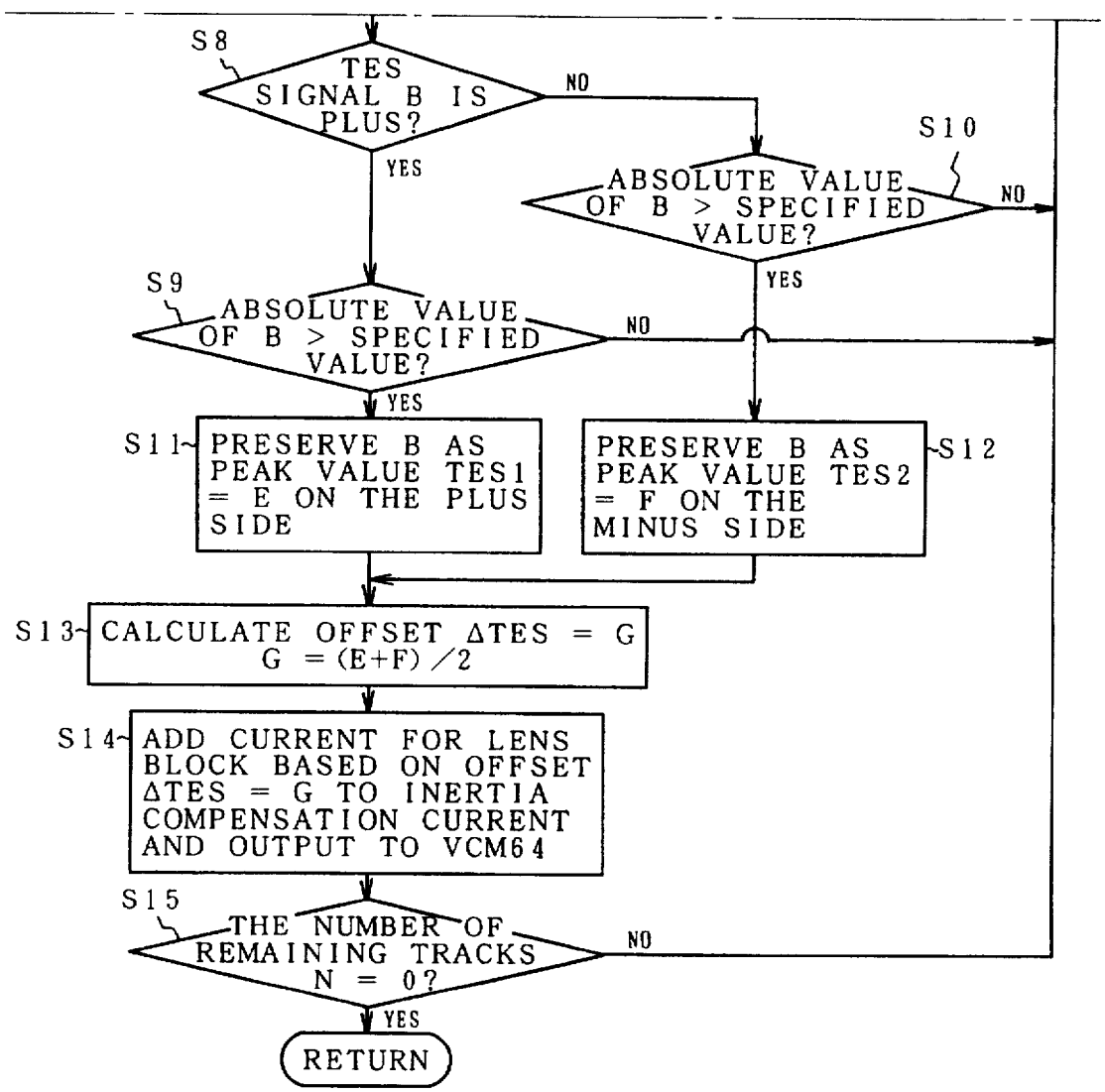

Flowcharts of FIGS. 15A and 15B relate to the inertia compensation control for the VCM 64 and the lens lock control by the low speed lens lock control unit 15-1 during the low speed seek which are executed in step S7 in FIG. 14. In the flowcharts, the processes are repeated every sampling clock to decide an operating period of time of the DSP 15 in FIG. 9. First in step Si, a tracking error signal A obtained by the present sample is read. In step S2, a change amount C at one sampling period is calculated by (C=B−A). In step S4, the tracking error signal A of the present sample is substituted to a tracking error signal B of one sample before for the next process. In step S5, a check is made to see whether the absolute value of the change amount C calculated in step S3 is equal to or less than a specified value or not. When it is equal to or less than the specified value, the processing routine is returned to step S1 and the process at the next sampling timing is executed. The absolute value of the change amount C is equal to or less than the specified value when a beam speed is low and such a case corresponds to the stage at the start of the acceleration or the stop of the deceleration. Since the frequency is relatively low, the tracking error signal A of the present sample is eliminated.

When the absolute value of the change amount C exceeds the specified value in step S5, step S6 follows and the change amount C of one sample before is loaded and is set to a change amount D. In step S7, a check is made to see if a polarity of the change amount C of the present sample has been changed from a polarity of the change amount D of one sample before. Such a discrimination is substantially equivalent to a discrimination about whether the tracking error signal has passed a peak point or not. In step S7, when the polarity of the change amount C of the present sample is changed from the polarity of the change amount D of one sample before, since this means that the tracking error signal has passed the peak point, the processing routine advances to step S8. A check is made to see if the tracking error signal B at the present sample which was substituted as a tracking error signal B of one sample before in step S4 is plus. When it is plus, step S9 follows and a check is made to see if the absolute value of the tracking error signal B is larger than a specified value. If YES, in step S11, the tracking error signal B is preserved as a peak value (TES1=E) on the plus side. When the tracking error signal B is minus in step S8, step S10 follows and a check is made to see if the absolute value of the tracking error signal B is larger than a specified value in a manner similar to step S9. If YES, step S12 follows and the tracking error signal B is preserved as a peak value (TES2=F) on the minus side. In step S13, an offset (ΔTES= G) is calculated by the following equation.

$$G=(E+F)/2$$

In step S11 of the present sample, for example, if the peak value (TES1=E) on the plus side is derived, this means that at a timing of one sample before, the peak value (TES2=F) on the minus side has already been obtained in step S12. Therefore, the offset (ΔTES=G) can be calculated by the following equation.

$$G=(E+F)/2$$

The offset (ΔTES=G) calculated in step S13 at that time becomes the lens position signal E3. Therefore, the current for the lens lock based on the calculated offset (ΔTES=G) is added to the inertia compensation current in step S14. The resultant current is outputted to the VCM 64 serving as a carriage actuator and the present optical axial deviation is set to 0. Such processes in steps S1 to S14 are repeated every sample of the DSP 15. When the number N of remaining tracks is equal to 0 and the light beam reaches the target track in step S15, the processing routine is returned to the main routine in FIG. 14. The process in step S15 in FIG. 15B is the same as that in step S8 in FIG. 14, so that the processing routine in FIGS. 15A and 15B is returned to the pull-in control to the target track in the step S9 in FIG. 14.

FIGS. 16A to 16F are time charts at the time of the low speed seek control in the first embodiment of FIG. 9. In the low speed seek control, as shown in a beam speed of FIG. 16A, after the acceleration control was executed by the activation at time t1, when the speed reaches a constant target speed at time t2, the constant speed control is executed. The deceleration control is executed at time t3 that is a predetermined number of tracks before the target track. The track pull-in control is executed at time t4 when the light beam reaches the target track. For such a change in beam speed in FIG. 16A, the tracking error signal changes as shown in FIG. 16B. A frequency of the tracking error signal E1 is constant during the constant speed control for a period of time from t2 to t3. For such a constant speed period of time, the stable pseudo lens position signal E3 can be obtained. Therefore, the lens locking mode in which the lens lock control in FIG. 16F is turned on or off is turned on after the elapse of a delay time Td from the seek activation at time t1 to the constant speed control at time t2, thereby executing the lens lock control for the VCM by the pseudo lens position signal which is obtained on the basis of the tracking error signal E1. The current Ia which is supplied to the lens actuator 60 to obtain a profile of the beam speed in FIG. 16A is as shown in FIG. 16C. For example, when considering an outer seek in the acceleration period of time from t1 to t2, the current Ia that is supplied to the lens actuator 60 has a smooth current profile such that it increases step by step to the plus side and, after that, when the speed approaches the constant speed control, the current likewise decreases step by step. In a manner similar to the above case, as for the deceleration current from time t3, by increasing and decreasing step by step, a smooth deceleration is executed. The current Iv which is supplied to the VCM 64 for the inertia compensation simultaneously with the current Ia of the lens actuator 60 is as shown in FIG. 16D. As shown in FIG. 12, the VCM current Iv is a current obtained by multiplying the inertia compensation coefficient α1 that is given by the equation (1) to the lens actuator current Ia. Thus, the carriage is also accelerated and decelerated by the activation of the VCM 64 in response to the acceleration or deceleration of the lens actuator 60 in the low speed seeking mode. Therefore, even if a lens position signal is not derived upon acceleration or deceleration, there is no relative shift between the lens actuator and the carriage, so that the occurrence of an optical axial deviation of the objective lens is certainly prevented. With respect to the constant speed period of time between t2 and t3, since the lens lock control is executed because the pseudo lens position signal is derived from the tracking error signal E1, the lens lock to always maintain the optical axial deviation of the objective lens to zero can be certainly executed. In such a low speed seek control, a seeking mode as shown in FIG. 16E is turned on by the start of the seek at time t1 and is turned off by the pull-in control due to the arrival to the target track at time t4.

FIGS. 17A to 17E are time charts for the high speed seek control in the first embodiment of FIG. 9. In the high speed seek control, the beam speed is accelerated by the driving of the VCM at time t1 as shown in FIG. 17A. After the speed reached the specified high constant speed at time t2, the deceleration control of the VCM is executed at time t3 when the number of tracks to the target track reaches the specified number of tracks serving as a switching reference of the low speed seek control. The control mode is switched to the low speed seek control at time t4. Namely, as shown in a control mode of FIG. 17E, the high speed seeking mode is set for a time interval between t1 and t4 and the low speed seeking mode is set after that. The low speed seeking mode from time t4 is fundamentally the same as the constant speed seek control in FIGS. 16A to 16F except that the control mode is immediately shifted to the constant speed control without needing the acceleration period of time. The deceleration of the low speed seek control is executed at time t3 of a predetermined number of tracks before the target track. When the light beam reaches the target track at time t7, the pull-in control is executed. The settlement is finished at time t8.

For the beam speed in the high speed seeking mode in FIG. 17A as mentioned above, the tracking error signal E1 is as shown in FIG. 17B. Namely, although the signal E1 has a high frequency of tens of kHz during the high speed seek, when the control mode is switched to the low speed seek control in the middle of the seek, the frequency is changed to a low frequency of 10 kHz or less. During the high speed seek for a time interval between t1 and t4, as shown in FIG. 17D, the speed control is executed by supplying the current Iv to the VCM. With respect to the VCM current Iv as well, for the acceleration period of time between t1 and t2, by increasing the VCM current step by step, the carriage is smoothly accelerated. Similarly, for the deceleration period of time between t3 and t4 as well, by increasing and decreasing the current in the minus direction step by step, the carriage is smoothly decelerated. At the same time, the lens actuator current Ia in FIG. 17C is a current obtained by multiplying the inertia compensation coefficient α2 in the equation (3) in FIG. 13 to the VCM current Iv. By also supplying the inertia compensation current Ia to the lens actuator 60 simultaneously with the acceleration of the carriage by the VCM 64, the lens actuator is driven so as to overcome the inertia force in association with the activation of the carriage. The lens lock to hold the objective lens to the position where the optical axial deviation is equal to 0 is executed. The same shall also similarly apply to the deceleration of the VCM for a time interval between t3 and t4. The inertia compensation current Ia is supplied to the lens actuator 60 and the optical axial deviation of the objective lens is held to 0 so that the lens actuator 60 installed doesn't overrun due to the inertia in response to the deceleration of the carriage. During the constant speed control for a time interval between t2 and t3, since the frequency of the tracking error signal E1 is almost constant to be, for example, tens of kHz, the stable lens position signal E4 is derived. The lens lock by the position control of the lens actuator 60 is certainly executed so as to set the lens position signal E4 to 0. The control in the low speed seeking mode after time t4 is substantially the same as that in case of the low speed seek control after time t2 shown in FIGS. 16A to 16F.

Figure 18:
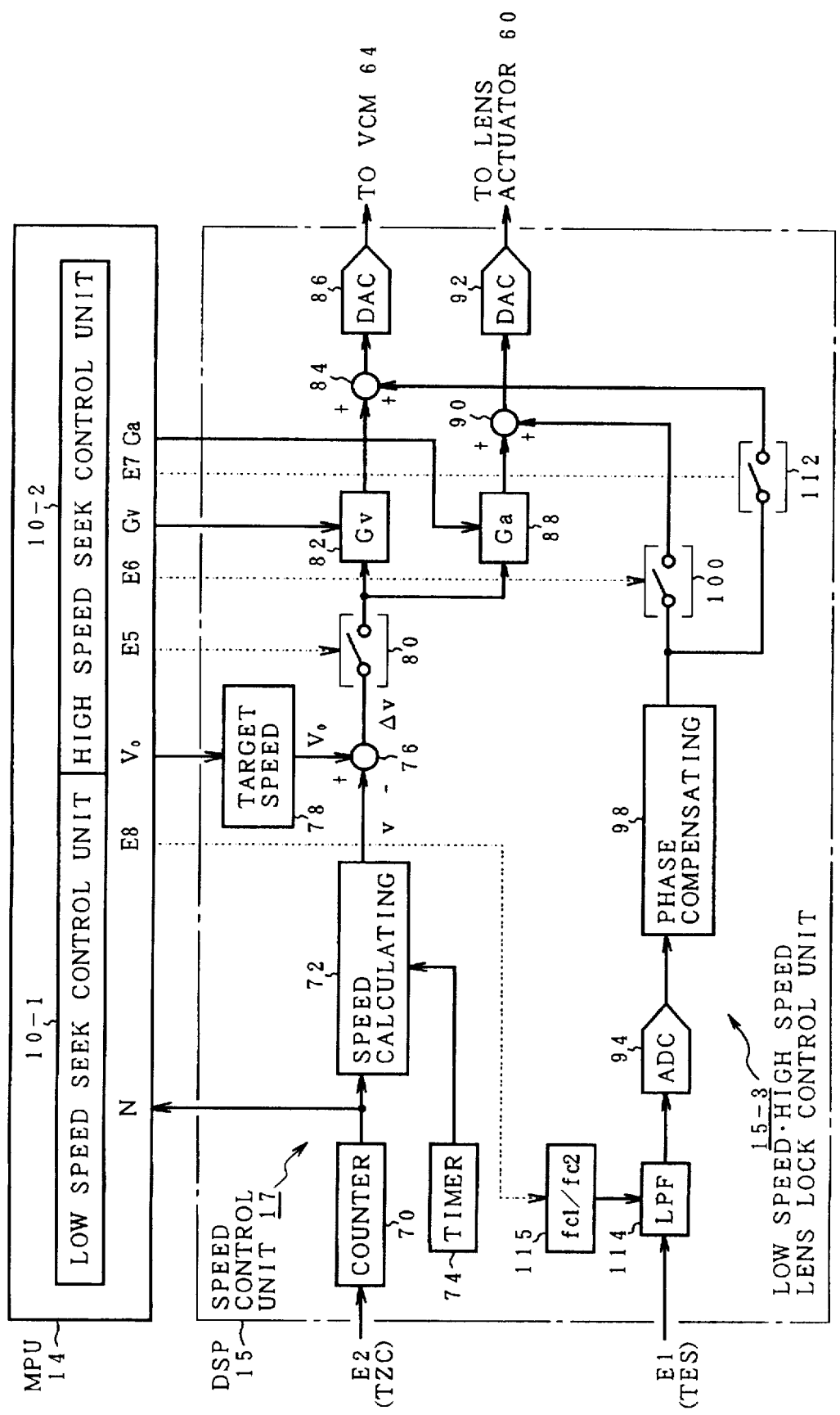
FIG. 18 is a block diagram of the second embodiment of the seek control unit in FIG. 8.

FIG. 18 shows the second embodiment of a seek control unit of the invention. The second embodiment is characterized in that low pass filters for detecting the lens position signals in the low speed seeking mode and the high speed seeking mode are commonly constructed and the cut-off frequency of the low pass filter is switched in the low speed seeking mode and the high speed seeking mode. In the embodiment, the low speed lens lock control unit 15-1 and high speed lens lock control unit 15-2 in FIG. 10 are constructed as a common low speed/high speed lens lock control unit 15-3. A low pass filter 114 whose cut-off frequency can be switched by a control signal E8 from the MPU 14 is provided for the low speed/high speed lens lock control unit 15-3. A filter characteristics switching unit 115 to switch the cut-off frequency of the low pass filter 114 to either one of a cut-off frequency fc1 on the low band side and a cut-off frequency fc2 on the high band side is provided for the low pass filter 114.

Figure 19:
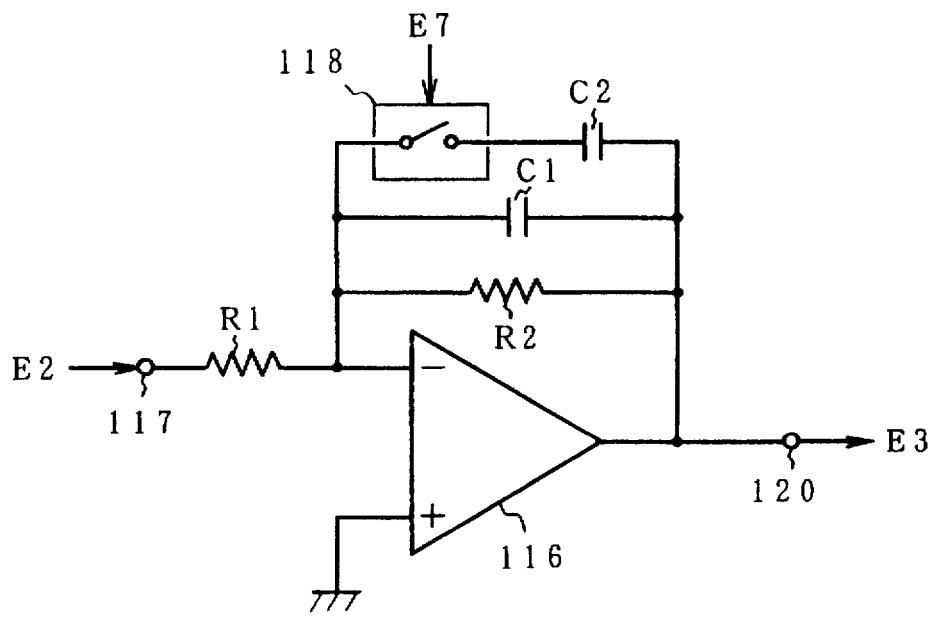
FIG. 19 is a circuit diagram of a filter characteristics switching unit and a low pass filter in FIG. 18.

FIG. 19 shows a circuit construction of the low pass filter 114 and filter characteristics switching unit 115 in FIG. 18. This circuit construction is realized as an analog active filter. In the active filter which functions as a low pass filter 114, a minus (−) input terminal 117 of an operational amplifier 116 is connected through a resistor R1. An output of the operational amplifier 116 is fed back and connected to the input terminal 117 through a resistor R2. A capacitor C1 is connected in parallel with the feedback resistor R2. Further, a serial circuit of a capacitor C2 and an analog switch 118 is connected in parallel with the feedback resistor R2. The capacitors C1 and C2 provided for the feedback circuit determine the cut-off frequency of the low pass filter.

Figure 20:
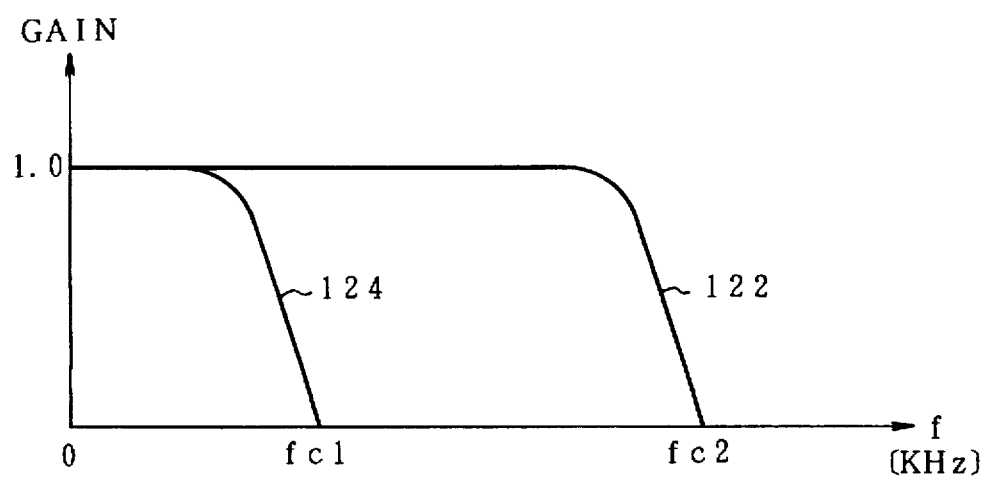
FIG. 20 is an explanatory diagram of characteristics of the low pass filter in a low speed seeking mode and a high speed seeking mode in FIG. 19.

FIG. 20 shows frequency characteristics of the low pass filter in FIG. 19. When the analog switch 118 is turned off as shown in the diagram, the LPF shows filter characteristics 122. When the analog switch 118 is turned on, the LPF shows a position of filter characteristics 124. Namely, in the low speed seeking mode, the analog switch 118 is turned on and the capacitors C1 and C2 are connected in parallel with the feedback circuit. Therefore, a capacitance in this instance is equal to C1+C2 and the cut-off frequency fc1 is located on the low band side as shown in the filter characteristics 124. In the high speed seeking mode, the analog switch 118 is turned off as shown in the diagram and the capacitor C2 is disconnected, so that the cut-off frequency is determined by only the capacitor C1. A capacitance in this instance is smaller than the capacitance (C1+C2) in the low speed seeking mode. Therefore, the cut-off frequency is set to fc2 on the high band side as shown by the filter characteristics 122 in FIG. 20.

Referring again to FIG. 18, an output of the LPF 114 whose cut-off frequency can be switched is converted into digital data by the A/D converter 96. After that, the high frequency components of the digital data are subjected to an advance phase compensation by the phase compensating unit 98. The phase compensated digital data is subsequently supplied to the addition point 90 or 84 through the servo switch 100 or 112. In the low speed seeking mode, the servo switch 112 is turned on and the servo switch 110 is turned off. The filter characteristics switching unit 115 switches the low pass filter 114 to the cut-off frequency fc1 on the low band side. Thus, a pseudo lens position signal is detected from the tracking error signal derived by the low speed seek and is added to the addition point 84 on the VCM 64 side through the servo switch 112, thereby performing the lens lock to the speed control by the lens actuator 60 by the driving of the VCM. In the high speed seeking mode, on the contrary, the servo switch 100 is turned on and the servo switch 112 is turned off. In this instance, the filter characteristics switching unit 115 switches the LPF 114 to the cut-off frequency fc2 on the high band side. The lens position signal is detected by the characteristics of the LPF 114 adapted to the tracking error signal of the high frequency obtained by the high speed seek. The lens position signal is added to the lens actuator 60 side through the servo switch 100, thereby performing the lens lock. For example, assuming that the frequency of the tracking error signal is set to 10 kHz in a low speed state and to 50 kHz in a high speed state, the cut-off frequencies fc1 and fc2 in the low band and high band of the LPF 114 are set to 2.0 kHz and 10 kHz which are equal to 1/5 of those frequencies. They can be also set to 1.0 kHz and 5 which are equal to 1/10 of those frequencies. It is sufficient to decide the optimum cut-off frequencies at which the stable lens position signal is obtained.

Figure 21:
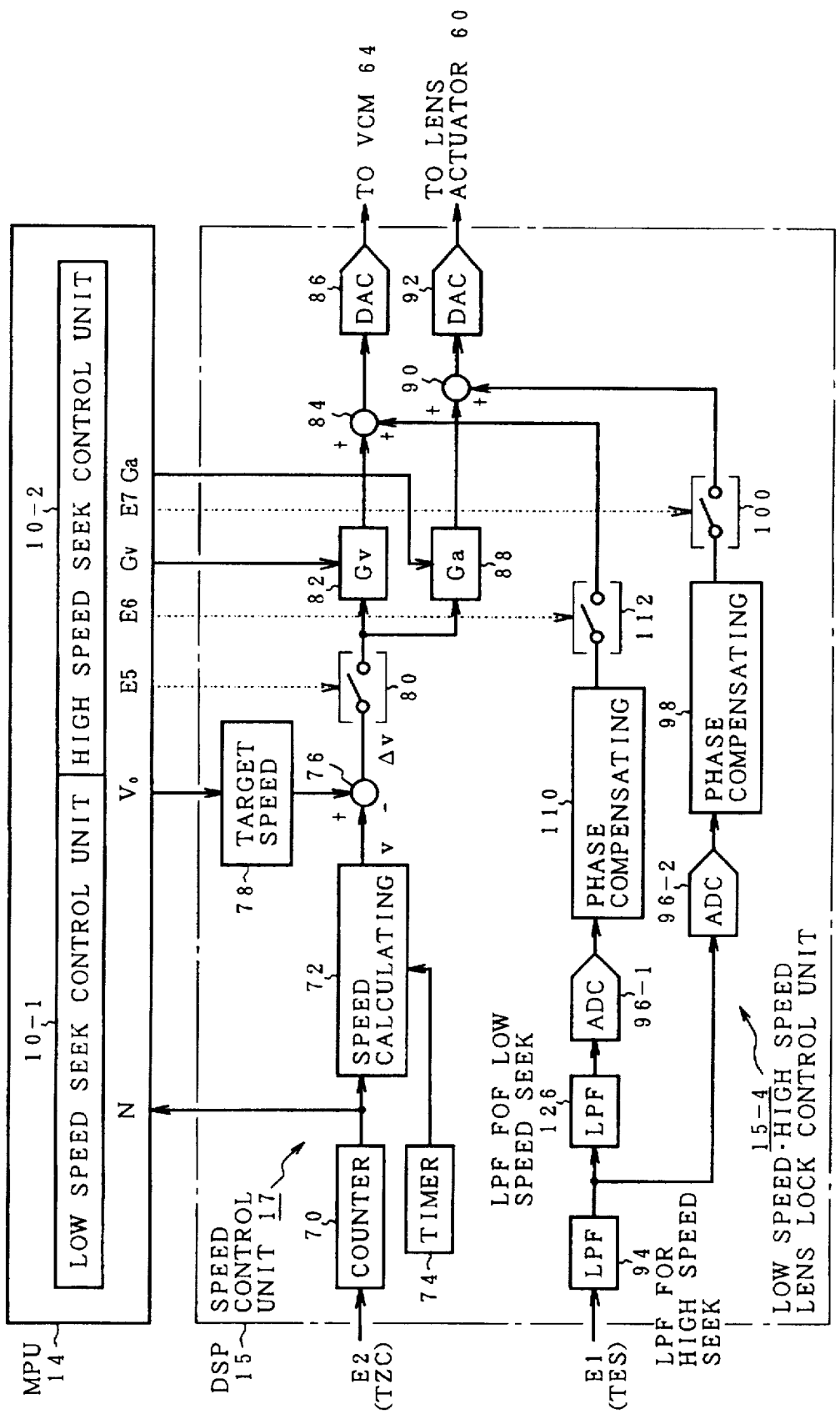
FIG. 21 is a block diagram of the third embodiment of the seek control unit in FIG. 8.

FIG. 21 shows the third embodiment of the invention. The third embodiment is characterized in that the lens lock control units in the high speed seeking mode and the low speed seeking mode are commonly constructed in a manner similar to the second embodiment and, further, the low pass filters of the frequency characteristics corresponding to the low speed seek and high speed seek are combined, thereby enabling each of the lens position signals to be detected from the tracking error signal. The low pass filter 94 for a high speed seek is provided for the low speed/high speed lens lock control unit 15-4. The LPF 94 for a high speed seek has the cut-off frequency fc2 on the high band side as shown in the filter characteristics 122 in FIG. 20. Subsequent to the LPF 94 for a high speed seek, a low pass filter 126 for a low speed seek is serially connected. The LPF 126 for a low speed seek has the cut-off frequency fc1 on the low band side as shown in the filter characteristics 124 in FIG. 20. An output of the LPF 126 for a low speed seek is connected to the addition point 84 on the VCM 64 side through an A/D converter 96-1, phase compensating unit 110, and servo switch 112. On the other hand, the output of the LPF 94 for a high speed seek is branched and connected to the addition point 90 on the lens actuator 60 side through an A/D converter 96-2, phase compensating circuit 98, and servo switch 100. The on-off operations of the servo switches 112 and 100 are controlled by the control signals E6 and E7 from the MPU 14. Namely, in the low speed seek control, the servo switch 100 is turned off and the servo switch 112 is turned on. Therefore, the output from the LPF 94 for a high speed seek to the adder is disconnected. The lens position signal stopped by the LPF 126 for a low speed seek is supplied to the addition point 84, so that the lens lock by the driving of the VCM 64 is executed during the speed control of the lens actuator 60. In this case, although the tracking error signal E1 passes through the LPF 94 for a high speed seek, the cut-off frequency fc2 is located sufficiently on the high band side as shown in FIG. 20, the tracking error signal E1 of 10 kHz or less during the low speed seek is inputted to the LPF 126 for a low speed seek without being deteriorated by the LPF 94. Since the high frequency components exceeding the cut-off frequency fc2 are cut by the LPF 94, an S/N ratio of the tracking error signal which enters the LPF 126 for a low speed seek can be sufficiently improved. On the other hand, in the high speed seeking mode, the servo switch 100 is turned on and the servo switch 112 is turned off. Therefore, the output of the LPF 126 for a low speed seek is disconnected and the output of the LPF 94 for a high speed seek is added to the adder 90 through the servo switch 100. In this instance, the tracking error signal has a high frequency of tens of kHz due to the high speed seek. The stable lens position signal can be obtained by the removal of the high frequency components by the LPF 94. The lens lock by the lens actuator 60 can be and certainly executed during the speed control by the driving of the VCM 64.

In the above embodiment, although all of the speed control and the continuous controls in the high speed state and low speed state have been realized by the digital arithmetic operating function of the DSP 15, the invention is not limited to such a method but a part of them or the whole control can be also realized by an analog circuit or an exclusive-use LSI circuit.

According to the invention as mentioned above, when the lens position signal is falsely detected from the tracking error signal and the lens lock is performed without providing the lens position sensor, even if there is a large frequency difference between the tracking error signals in the high speed seeking mode and low speed seeking mode, the stable lens position signal can be detected from the tracking error signal in each of the high speed seeking mode and low speed seeking mode.

Therefore, the offset of the tracking error signal is prevented and the track counting operation can be certainly executed on the basis of the detection of the track zero-cross point during the seek. Since the offset of the tracking error signal is prevented at a position just before the beam pull-in to the target track, the light beam can be accurately and promptly pulled in to the target track and the stable seeking operation can be guaranteed. Thus, the accessing performance of the optical disk drive can be improved.

What is claimed is:

1. An optical storage apparatus comprising:
   a lens actuator for moving an objective lens to irradiate a light beam to a medium in a direction transverse to tracks on the medium;

a carriage actuator for moving a carriage on which said lens actuator is mounted in the direction which transverses the tracks on the medium;

a tracking error signal forming circuit for forming a tracking error signal according to a position of said light beam in the direction which transverses the tracks on the basis of a photosensitive output of a return light from the medium;

a low speed seek control unit for moving the light beam to a target position at a low speed by a driving of said lens actuator;

a high speed seek control unit for moving the light beam to a target position at a high speed by a driving of said carriage actuator;

a low speed lens lock control unit for detecting an amount of an optical axial deviation of said objective lens from an offset of the tracking error signal which is obtained in said low speed seeking mode and driving said carriage actuator so as to set the optical axial deviation of said objective lens to zero; and a high speed lens lock control unit for detecting an amount of an optical axial deviation of said objective lens from an offset of the tracking error signal which is obtained in said high speed seeking mode and driving said lens actuator so as to set the optical axial deviation of said objective lens to zero.

2. An apparatus according to claim 1, wherein said low speed lens lock control unit has:

a peak value detecting unit for detecting a positive peak value and a negative peak value of each cycle of the tracking error signal; and an offset calculating unit for calculating a value of ½ of a difference between said positive and negative peak values as an offset amount and detecting a pseudo lens position detection signal.

3. An apparatus according to claim 1, wherein said high speed lens lock control unit has a low pass filter for removing high frequency components by a cut-off frequency corresponding to a frequency of the tracking error signal in the high speed seeking mode and detecting an offset amount corresponding to a change in envelope of said tracking error signal as a lens position signal.

4. An apparatus according to claim 1, wherein said low speed and high speed lens lock control units have:

a low pass filter for removing high frequency components of the tracking error signal and detecting an offset amount which traces a change in envelope as a lens position signal; and a filter characteristics switching unit for switching a cut-off frequency of said low pass filter to a low band side in the low speed seeking mode and to a high band side in the high speed seeking mode.

5. An apparatus according to claim 1, wherein said low speed and high speed lens lock control units have:

a low pass filter for a high speed for removing high frequency components by a cut-off frequency on a high band side corresponding to a frequency of the tracking error signal in the high speed seeking mode and generating as a lens position signal; and a low pass filter for a low speed, serially connected to said low pass filter for a high speed, for removing high frequency components by a cut-off frequency on a low band side corresponding to a frequency of the tracking error signal in the low speed seeking mode and generating as a lens position signal.

6. An apparatus according to claim 1, wherein when the number of tracks to a target track is less than a predetermined value, the light beam is moved at a low speed by said low speed seek control unit.

7. An apparatus according to claim 1, wherein when the number of tracks to a target track exceeds a predetermined value, the light beam is moved at a high speed by said high speed seek control unit, and when the number of tracks to the target track reaches another predetermined value during said high speed movement, a control mode is switched to a low speed movement of the light beam by said low speed seek control unit.

8. An apparatus according to claim 1, wherein said low speed seek control unit controls a speed of said lens actuator so as to trace a target speed which was set in accordance with the number of tracks to a target track and applies an acceleration or a deceleration for an inertia compensation corresponding to the acceleration or deceleration of said lens actuator to said carriage actuator with respect to each of an acceleration period of time and a deceleration period of time of said speed control.

9. An apparatus according to claim 8, wherein said low speed seek control unit supplies an inertia compensation current Iv obtained by multiplying an inertia compensation coefficient $\alpha 1$ to an acceleration or deceleration current Ia of said lens actuator to said carriage actuator.

10. An apparatus according to claim 9, wherein said inertia compensation coefficient $\alpha 1$ is defined by the following equation:

$$\alpha 1 = (Kv/Ka) \cdot \{Ma/(Ma+Mv)\}$$

where,

Ka: acceleration gain of said lens actuator
Kv: acceleration gain of said carriage actuator
Ma: mass of said lens actuator
Mv: mass of said carriage actuator.

11. An apparatus according to claim 1, wherein said high speed seek control unit controls a speed of said carriage actuator so as to trace a target speed which was set in accordance with the number of tracks to a target track and applies an acceleration or a deceleration for an inertia compensation corresponding to the acceleration or deceleration of said carriage actuator to said lens actuator with respect to each of an acceleration period of time and a deceleration period of time of said speed control.

12. An apparatus according to claim 11, wherein said high speed seek control unit supplies an inertia compensation current Ia obtained by multiplying an inertia compensation coefficient $\alpha 2$ to an acceleration or deceleration current Iv of said carriage actuator to said lens actuator.

13. An apparatus according to claim 12, wherein said inertia compensation coefficient $\alpha 2$ is defined by the following equation:

$$\alpha 2 = (Ka/Kv) \cdot \{Mv/(Ma+Mv)\}$$

where,

Ka: acceleration gain of said lens actuator
Kv: acceleration gain of said carriage actuator
Ma: mass of said lens actuator
Mv: mass of said carriage actuator.

14. An apparatus according to claim 1, wherein said low speed seek control unit and said high speed seek control unit smoothly change an acceleration current and a deceleration current of the seek control, thereby smoothly accelerating and decelerating said lens actuator and said carriage actuator.

* * * * *

UNITED STATES PATENT AND TRADEMARK OFFICE
CERTIFICATE OF CORRECTION

PATENT NO. : 5,768,229
DATED : June 16, 1998
INVENTOR(S) : Toru Ikeda

It is certified that error appears in the above-identified patent and that said Letters Patent is hereby corrected as shown below:

Column 5, line 29, delete "a1" and insert

--$\alpha 1$-- therefor

Column 5, line 35, delete "coefficient$\alpha 1$"

and insert --coefficient $\alpha 1$-- therefor

Column 6, line 64, delete "150in" and insert

--150 in-- therefor

UNITED STATES PATENT AND TRADEMARK OFFICE
CERTIFICATE OF CORRECTION

PATENT NO. : 5,768,229
DATED : June 16, 1998
INVENTOR(S) : Toru Ikeda

It is certified that error appears in the above-identified patent and that said Letters Patent is hereby corrected as shown below:

Column 13, line 44, delete "NO" and insert

--N0-- therefor

Column 17, line 52, delete "Si" and insert

--S1-- therefor

UNITED STATES PATENT AND TRADEMARK OFFICE
CERTIFICATE OF CORRECTION

PATENT NO. : 5,768,229
DATED : June 16, 1998
INVENTOR(S) : Toru Ikeda

It is certified that error appears in the above-identified patent and that said Letters Patent is hereby corrected as shown below:

Column 19, line 22, delete "coefficient$\alpha$1"

and insert --coefficient $\alpha$1-- therefor

Column 22, line 36, delete "and" and insert

--stably and-- therefor

Signed and Sealed this

Twenty-ninth Day of June, 1999

Attest:

Q. TODD DICKINSON

Attesting Officer

Acting Commissioner of Patents and Trademarks